(12) United States Patent
Kitano et al.

(10) Patent No.: US 7,015,799 B1
(45) Date of Patent: Mar. 21, 2006

(54) APPARATUS INSTALLING DEVICE FOR MOBILE BODY

(75) Inventors: Toyoaki Kitano, Tokyo (JP); Masahiro Ieda, Tokyo (JP); Osamu Kono, Tokyo (JP); Shimon Okada, Tokyo (JP); Kei Kasuga, Tokyo (JP); Shinichi Kato, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/018,552

(22) PCT Filed: Apr. 27, 2000

(86) PCT No.: PCT/JP00/02757

§ 371 (c)(1),
(2), (4) Date: Dec. 20, 2001

(87) PCT Pub. No.: WO01/83266

PCT Pub. Date: Nov. 8, 2001

(51) Int. Cl.
*B60Q 1/00* (2006.01)

(52) U.S. Cl. .................... 340/425.5; 180/89.11; 280/727

(58) Field of Classification Search ............ 340/425.5, 340/426.1, 5.8, 5.81, 5.82, 5.83, 5.84; 180/89.11; 280/727
See application file for complete search history.

(56) References Cited

FOREIGN PATENT DOCUMENTS

| DE | 198 22 638 A | 12/1999 |
|---|---|---|
| DE | 198 38 421 A | 3/2000 |
| JP | 1-59988 U | 4/1989 |
| JP | 01-105619 A | 4/1989 |
| JP | 155230/1987 | 4/1989 |
| JP | 3-40257 U | 4/1991 |
| JP | 102343/1989 | 4/1991 |
| JP | 04-185547 A | 7/1992 |
| JP | 1992-86638 | * 12/1992 |
| JP | 405032138 | * 2/1993 |
| JP | 6-49220 U | 7/1994 |
| JP | 86638/1992 | 7/1994 |
| JP | 10-297379 A | 11/1998 |
| JP | 10-297391 A | 11/1998 |
| JP | 11296190 | * 10/1999 |
| JP | 11 321465 A | 2/2000 |
| JP | 2000 052875 A | 9/2000 |

OTHER PUBLICATIONS

Nikeei Electronics No. 759 Dec. 13, 1999 'Bluetooth' pp. 140-151.

* cited by examiner

*Primary Examiner*—Julie Bichngoc Lieu
(74) *Attorney, Agent, or Firm*—Birch, Stewart, Kolasch & Birch, LLP

(57) ABSTRACT

A device installation apparatus for a mobile body is disposed in a position sandwiched between a driver's seat 107a and a assistant driver's seat 197b in an automobile vehicle 100, and is constituted by a center console box 109, as an installing means, movable along a rail portion 110, in which a desired device such as a CD player 201, a cassette tape player 202, a DVD player 203 or the like can be installed. Having been constituted as above, it allows passengers seated other than in front seats an easy access to the desired device 200, remarkably improving the convenience of the apparatus.

11 Claims, 38 Drawing Sheets

APPARATUS INSTALLING DEVICE FOR MOBILE BODY

This application is the national phase under 35 U.S.C. § 371 of PCT International Application No. PCT/JP00/02757 which has an International filing date of Apr. 27, 2000, which designated the United States of America.

TECHNICAL FIELD

This invention relates to a device installation apparatus for a mobile body, which is mounted in a position sandwiched between a driver's seat and a assistant driver's seat for installing therein the devices such as audio devices, image reproducing devices or the like to be equipped in an automobile vehicle and the like.

BACKGROUND ART

FIG. 33 is a schematic diagram showing an inside of a conventional automotive vehicle.

As shown in this FIG. 33, in the conventional automotive vehicle, reference numeral 330 denotes an instrument panel provided in a front portion inside of the automotive vehicle, reference numeral 331 denotes an audio system such as a radio receiver, a cassette deck player, a compact disc (CD) player or the like provided in a central portion 330a of the instrument panel 330, reference numeral 332 denotes a dash board provided in a central upper portion of the instrument panel 330, reference numeral 333 denotes a steering wheel provided on the right of the instrument panel 330, reference numeral 340 denotes a driver's seat, reference numeral 341 denotes a assistant driver's seat, and reference numeral 350 denotes a central console box disposed in a position sandwiched between the driver's seat 340 and the assistant driver's seat 341.

Conventionally, it has been the dominant influence of the times to configure such that the audio system 331 is disposed in the central portion 330a of the instrument panel 330.

On the other hand, with the recent wide spreading of a navigation system, there have gradually been come into market automobile vehicles of the following arrangements: an arrangement in which a main body (not shown) of the navigation system is disposed under the front seat such as the driver's seat, the assistant driver's seat or the like and a displaying portion for displaying thereon map information outputted from the navigation system is disposed near the central portion of the instrument panel; an arrangement in which the space for disposing an audio system is narrowed to dispose the displaying portion in an upper central portion of the instrument panel, i.e., to embed it inside the dash board; and an arrangement in which instruments indicating the state of a brake system which is disposed on the driver's seat side of the instrument panel, are disposed in the central portion of the instrument panel. This kind of arrangements will come to be the main current in the future.

In addition, arrangements considered disposition of the displaying portion, there have been known automobile vehicles of the following arrangements: an arrangement in which the displaying portion is disposed in the central upper portion of the instrument panel, i.e., is embedded inside the dash board; and an arrangement in which the displaying portion is embedded previously inside a part of a group of audio devices disposed in the central portion of the instrument panel, after the displaying portion is projected forward when it is in use, a display surface of the displaying portion moving substantially in parallel with the surface in the central portion of the instrument panel (in-dash type display apparatus).

In this background, Japanese Patent Application Laid-open No. 297391/1998 discloses an automobile vehicle in which switches for the audio devices, the air conditioner or the like which are conventionally disposed in the central portion of the instrument panel are provided inside a center console disposed between the driver's seat and the assistant driver's seat. FIG. 34 is a schematic diagram showing a principal portion of the above arrangement.

In FIG. 34, reference numeral 1 denotes an instrument panel provided in a front portion inside the automobile vehicle, reference numeral 2 denotes a steering wheel provided on the right side of the instrument panel 1, reference numeral 3 denotes a gear shift lever provided in the central lower portion of the instrument panel 1, reference numeral 4 denotes a display provided in a central upper portion of the instrument panel 1, and reference numeral 5 denotes front seats, the front seats 5 being disposed by arranging a assistant driver's seat 5a and a driver's seat 5b in a line.

In addition, in a position sandwiched between the assistant driver's seat 5a and the driver's seat 5b, a center console 6 is disposed. As shown in FIG. 35, the center console 6 is provided with a lid 6a and a housing portion is formed inside the center console, which is opened and closed by this lid 6a.

Further, in a part of the front of the center console 6, a switch panel portion 6b formed in a recessed shape is provided. A remote control unit 7 can be detachably mounted in this switch disposing portion 6b.

Having been arranged as described above, it allows a passenger seated in the driver's seat or in the assistant driver's seat of the automotive vehicle to easily be operated the switches in a seated posture.

Further, Japanese Patent Application Laid-open No. 185547/1992 discloses a construction of a conventional improved model of an in-dash type of display apparatus. FIG. 36 is an overall arrangement view of this apparatus.

In addition, FIGS. 37 and 38 are figures explaining the a state of the operation of this display apparatus. FIG. 37 shows a state in which the display is not in use and FIG. 38 shows a state in which the display is moving to the predetermined position so as to get into the state in FIG. 36 in which the display is in a position ready for use.

In FIGS. 36, 37 and 38, reference numeral 10 denotes a casing, reference numeral 11 denotes the display which is housed inside the casing 10 when it is not in use and taken out of the casing 10 when it is in use, and reference numeral 12 denotes a sliding member (arm) for supporting the display 11. This sliding member 12 is, when the display 11 is being housed, housed inside the casing 10 together with the display 11.

However, the conventional audio devices and the image reproducing devices are arranged as described above and mounted inside the automotive vehicle. Therefore, there has been a problem that a space for disposition is limited in the central portion of the instrument panel, and the devices to be installed in this space must therefore be deliberately selected by the user. Particularly, the user who wishes to equip various kinds of audio deices and image reproducing devices inside the automotive vehicle suffers from a serious inconvenience.

Further, the audio device is disposed in the central portion of the instrument panel. Therefore, there has been a problem that the replacement of the recording media such as cassette tapes, digital audio tapes (DAT's), compact discs (CD's), minidiscs (MD's), digital versatile discs (DVD's), or the simultaneous setting operation of each device or a plurality of devices are only allowed for passengers seated in the driver's seat and the assistant driver's seat. That is, passengers other than those seated in the front seats, i.e., the passengers seated in the rear seats are not allowed to operate in a seated state, with the result that the passengers seated in the rear seats suffer from a serious inconvenience.

Further, passengers are seated far from the displaying means. Therefore, there has been a problem that the disposition of the displaying means for displaying visual information from the image reproducing device or the like is disposed in the central portion of the instrument panel provides the passengers seated in the front seats a better visibility. However, it provides the passengers seated in the rear seats a poor visibility.

Further, when the audio device or the image reproducing device is operated, the operating means thereof is normally integrated with the device. Therefore, there has been a problem that the operator is obliged to extend his or her arm toward the central portion of the instrument panel. It follows that the passengers seated in the rear seats cannot operate it, and even the passengers seated in the front seats must also change their posture from a posture leaning back in the seat to a posture forwardly bent in the seat before operating the device. Accordingly, the operation cannot easily be made.

Further, an arrangement in which an operating means is separated as a remote controller (hereinafter refers as a remocon) from the apparatus itself is also known. In this kind of arrangement, after having operated with the remote controller, the remote controller is often left detached from the housing place. Ordinarily, the remote controller is small in size. Therefore, there has been a problem that it is apt to lose, and thus the operator gets into the trouble that he or her has to look for it before operating.

Further, the audio device, the image reproducing device or the like is disposed in the central portion of the instrument panel and fixed to make a connection of wires or the like inside the instrument panel, the number of devices which is disposable in the instrument panel space available is narrow being restricted. In disposing, a user is compelled to deliberately select the specific device. In addition, the devices are fixed to part of the instrument panel by means of screws or the like. Therefore, there has been a problem that the replacing work of the device now mounted by a different one is cumbersome.

Further, when devices disposed in the apparatus are activated, anybody can access to them. Therefore, there has been a problem that when children are present in the passengers, persons who are not welcome to operate the devices can also gain an easy access to their operation.

Further, when the devices disposed in the apparatus are detachable, anybody can detach them. Therefore, there has been a problem that the devices mounted on the apparatus are subject to the damages of stealing, tampering or the like.

Further, the operating means such as a touch panel displaced on the like for operating the contents displayed on the displaying means is disposed together with the displaying means in the central portion of the instrument panel. Therefore, there has been a problem that, when the operating means is operated, the operator must change his or her posture from one leaning back to the seat to one forwardly bent in the seat before operating the operating means, or the operator is obliged to extend his or her arm toward the operating means, with the result that the operation cannot easily be done.

Furthermore, in case the space between the seats is devoted to a passage for the passengers like in a bus or the like, among the mobile bodies. Therefore, there has been a problem that nothing can be disposed on the floor because of a possible hindrance to the passage of the passengers.

This invention has been made to solve the above problems. An object of the invention is to provide a device installation apparatus for a mobile body for improving the convenience of the passengers and the operability, by disposing it in a position sandwiched between a driver's seat and a assistant driver's seat, and by providing an audio device and an image reproducing device on a installing means, movable along the longitudinal direction of the mobile body, so as to give not only the passengers seated in the front seats but also the passengers seated in the rear seats direct access to the devices installed inside the installing means.

Another object of the invention is to provide a device installation apparatus for a mobile body for improving the convenience of the passenger and operability, by moving the installing means to a position suitable for each of the front seats, rear seats and the intermediate seats between the front seats and the rear seats, so as to give the passengers seated in all of the seats inside the mobile body access to the devices.

Another object of the invention is to provide a device installation apparatus for a mobile body for improving the convenience of the passengers, by moving the installing means to a position suitable for the front seats, the rear seats, and the intermediate seats between the front seats and the rear seats, so as to allow the passengers seated in all of the seats to replace the memory medium inserted into each of the devices.

Another object of the invention is to provide a device installation apparatus for mobile body for enabling easy and free replacement of the devices to be installed inside the installing means, by providing a mounting/dismounting means with the installing means for detachably holding the devices.

Another object of the invention is to provide a device installation apparatus for a mobile body for finding more wider applications thereof, and for further improving the convenience of the apparatus, by providing a guide means for guiding the installing means not only on the floor portion but also on the roof portion, so as to dispose the installing means on the roof portion even in case the disposition of the installing means on the floor portion is difficult.

Another object of the invention is to provide a device installation apparatus for a mobile body for preventing from being wrongly operated or tampered, by restricting the operator who is permitted to access to the devices installed inside the installing means.

Another object of the invention is to provide a device installation apparatus for a mobile body for preventing from being wrongly operated, tampered, or stolen the devices installed inside the installing means, by restricting the operator who is permitted to mount or dismount the devices installed inside the installing means.

Another object of the invention is to provide a device installation apparatus for a mobile body for improving the visibility of the visual information even in the passengers seated in the rear seat, and for further improving the convenience of the apparatus, by providing the installing means.

Another object of the invention is to provide a device installation means for a mobile body and a displaying means disposed inside the mobile body for enabling the operation of the contents or the like displayed on the displaying means in a posture learning back in a seat, i.e., in a relaxedly seated posture, by providing the displaying means disposed in the central portion of the instrument panel with an operating means which projects rearward of the automotive vehicle.

Another object of the invention is to provide a device installation apparatus for a mobile body and a displaying means disposed inside the mobile body for preventing the operating means from being lost, by arranging the displaying means and the operating means separable through a supporting means.

Another object of the invention is to provide a device installation apparatus for a mobile body and a displaying means disposed inside the mobile body for enabling recognition of the visual information, irrespective of a state of the operation the operating means disposed inside the mobile body is used, by making a display only on the display surface which is able to display even when the operating means is overlapped with the displaying means.

Another object of the invention is to provide a device installation apparatus for a mobile body and a displaying means disposed inside the mobile body for enabling recognition of all the visual information to be displayed, and for further improving the convenience of the apparatus, irrespective of the size of the area of the display surface, by changing the ratio of scale of the displayed contents depending on reductions of the area of the display surface due to the overlapping of the operating means with the displaying means.

Another object of the invention is to provide a device installation apparatus for a mobile body and a displaying means disposed inside the mobile body for enabling recognition of the contents of the divided display, irrespective of the size of the area of the display surface, by making the divided display corresponding to each case, even if the area of the display surface of the displaying means is varied due to the overlapping of the operating means with the displaying means.

Another object of the invention is to provide a device installation apparatus for a mobile body and a displaying apparatus disposed inside the mobile body for enabling the operator to perform a operation adopted for respective users, and for further improving the operability of the apparatus, by adjusting the angle of the operating means relative to the displaying means for choice of the user.

DISCLOSURE OF INVENTION

The device installation apparatus for a mobile body according to this invention comprises: a installing means which is provided in a position sandwiched between a driver's seat and a assistant driver's seat and is able to install therein a desired device; and a guide means for movably guiding the installing means in the longitudinal direction of the mobile body. Thus, free movement of the apparatus to a position in which the operation of the device installed in the apparatus can easily be done by the user improves the operability and the convenience of the user.

The device installation apparatus for a mobile body according to this invention is arranged such that the guide means comprises a plurality of engaging portions for engaging the installing means at a plurality of the predetermined different positions, and that, when the installing means is moved based on guiding by the guide means, the installing means is engaged with any one of the plurality of engaging portions. Thus, in any position inside the mobile body, free movement of the apparatus to a position in which the operation of the device installed inside the apparatus can easily be done further improves the convenience of the user.

The device installation apparatus for a mobile body according to this invention is arranged such that the engaging portions are provided in the guide means in order to correspond to positions of seats disposed in the mobile body, it becomes possible for the passengers seated other than in the driver's seat and the assistant driver's seat to operate the device installed in the apparatus even in their respective seated positions. Thus, the operation of the device without taking a strained posture further improves the operability of the passengers in the mobile body.

The device installation apparatus for a mobile body according to this invention is arranged such that installing means comprises a mounting/dismounting means for holding the installed device in a detachable manner, and such that the device is replaceable by another one. Thus, easy replacement of the device mounted on the mounting/dismounting means improves freedom of the arrangement of the apparatus.

The device installation apparatus for a mobile body according to this invention is arranged such that the installing means comprises a plurality of mounting/dismounting means which enable a plurality of devices to be independently replaced by other devices. Thus, easy change in the system consisting of a plurality of devices to be mounted on the apparatus improves the freedom in the design of the system and the convenience of the user.

The device installation apparatus for a mobile body according to this invention is arranged such that a space for housing a device is formed in the installing means, and such that the installing means has in an internal part the mounting/dismounting means. Thus, housing of the device inside the installing means prevents from being projected from it and minimizes the overall size of the apparatus inclusive of the devices.

The device installation apparatus for a mobile body according to this invention is arranged such that the apparatus further comprises a user judging means for judging whether a user of the apparatus is an appropriate user or not, and such that, only when the user judging means has judged the user to be the appropriate user, the user is permitted to access to the device installed inside the installing means. Thus, the user is selected, in other words, the inappropriate user is prohibited from being operated the apparatus and prevented from being malfunctioned, resulting in improvement in the reliability of the apparatus.

The device installation apparatus for a mobile body according to this invention is arranged such that the apparatus further comprises a user judging means for judging whether a user of the apparatus is an appropriate user or not, and such that, only when the user judging means has judged the user to be the appropriate user, dismounting of the device installed inside the installing means is permitted. Thus, the selection of the user, i.e., disablement of the mounting or the dismounting of the apparatus by an inappropriate user prevents the device from being stolen and improves the reliability of the apparatus.

The device installation apparatus for a mobile body according to this invention is arranged such that the user judging means makes a judgement as to whether the user is an appropriate user by verifying a fingerprint of the user. Thus, accurate judgement of the user further improves the reliability of the apparatus.

The device installation apparatus for a mobile body according to this invention is arranged such that the user judging means makes a judgement as to whether the user is an appropriate user by verifying a voice of the user. Thus, accurate judgement of the user further improves the convenience of the user.

The device installation apparatus for a mobile body according to this invention is arranged such that a device to be installed inside the installing means is at least one of an audio device for outputting audible information and an image reproducing device for outputting visual information. Thus, recognition of either the audible information or the visual information improves the convenience of the apparatus.

The device installation apparatus for a mobile body according to this invention is arranged such that the installing means and the guide means are disposed on a floor portion of the mobile body. Thus, the movement of the apparatus while remaining seated improves the convenience of the apparatus.

The device installation apparatus for a mobile body according to this invention is arranged such that the installing means has the displaying means for displaying visual information outputted by the device installed inside the installing means.

The device installation apparatus for a mobile body according to this invention is arranged such that the installing means and the guide means are disposed on a floor portion of the mobile body. Thus, the movement of the apparatus even in seated posture improves the convenience of the apparatus.

The device installation apparatus for a mobile body according to this invention is arranged such that the installing means and the guide means are disposed on a roof portion of the mobile body. Thus, the apparatus can be mounted inside the mobile body even if the floor portion is not available. This gives a wider possibility of selection in mounting the apparatus, and an opportunity to dispose various kinds of apparatus, which improves the convenience of the apparatus.

The device installation apparatus for a mobile body according to this invention is arranged such that the apparatus further comprises a control means for moving the installing means, when a power source is turned off after the installing means is moved, the installing means returns to the predetermined position. Thus, automatic returning of the apparatus to the predetermined position improves the convenience of the apparatus.

The device installation apparatus for a mobile body according to this invention is arranged such that the predetermined position is a position sandwiched between the driver's seat and the assistant driver's seat of the mobile body. Therefore, automatic movement of the apparatus to the position of higher frequency in use improves the convenience of the apparatus.

BEST MODE FOR CARRYING OUT THE INVENTION

In order to describe this invention in more detail, best mode for carrying out this invention will now be described with reference to the accompanying drawings.

First Embodiment

Figure 1:
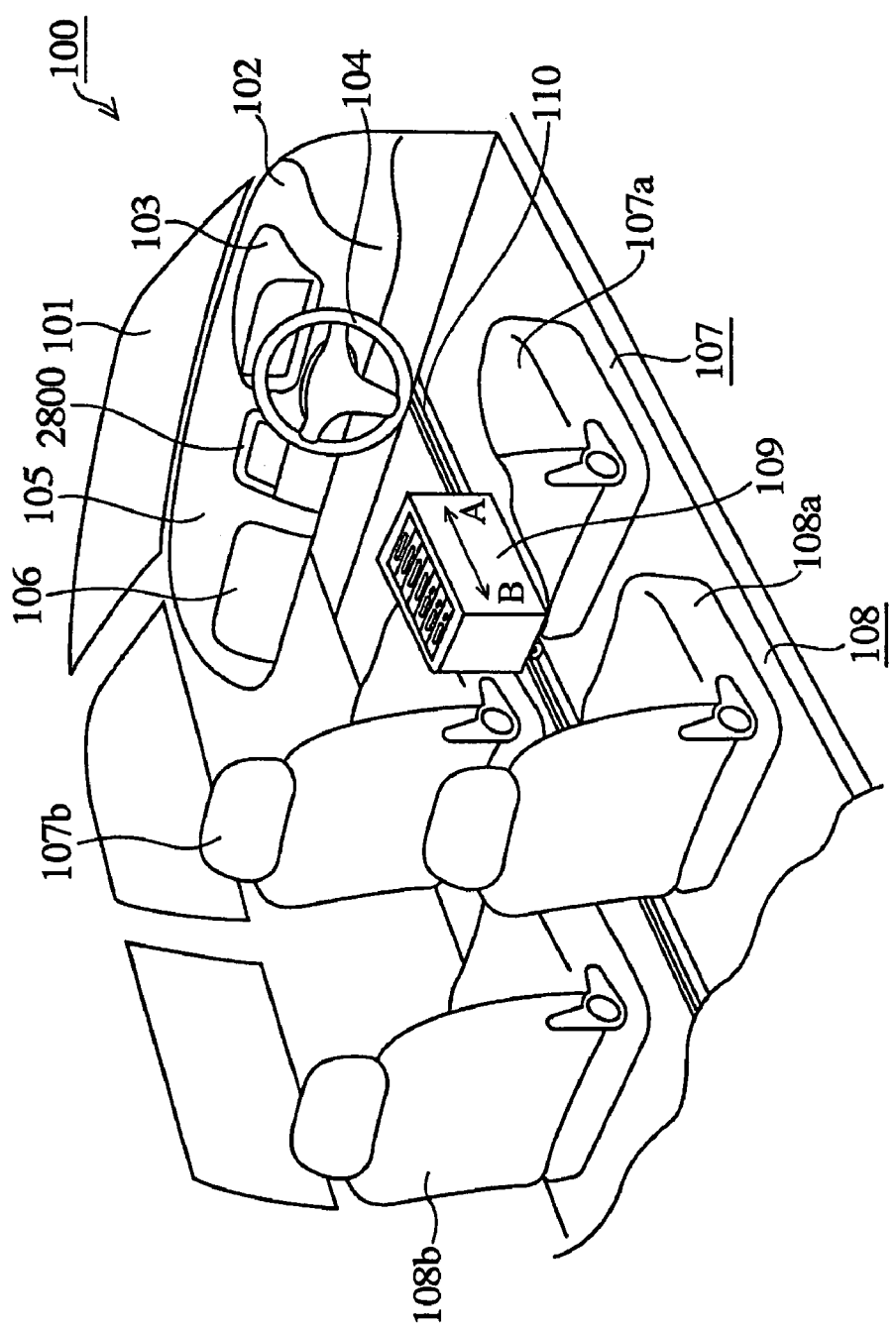
FIG. 1 is a schematic diagram showing a general arrangement of a device installation apparatus for a mobile body according to the first embodiment.
Figure 2:
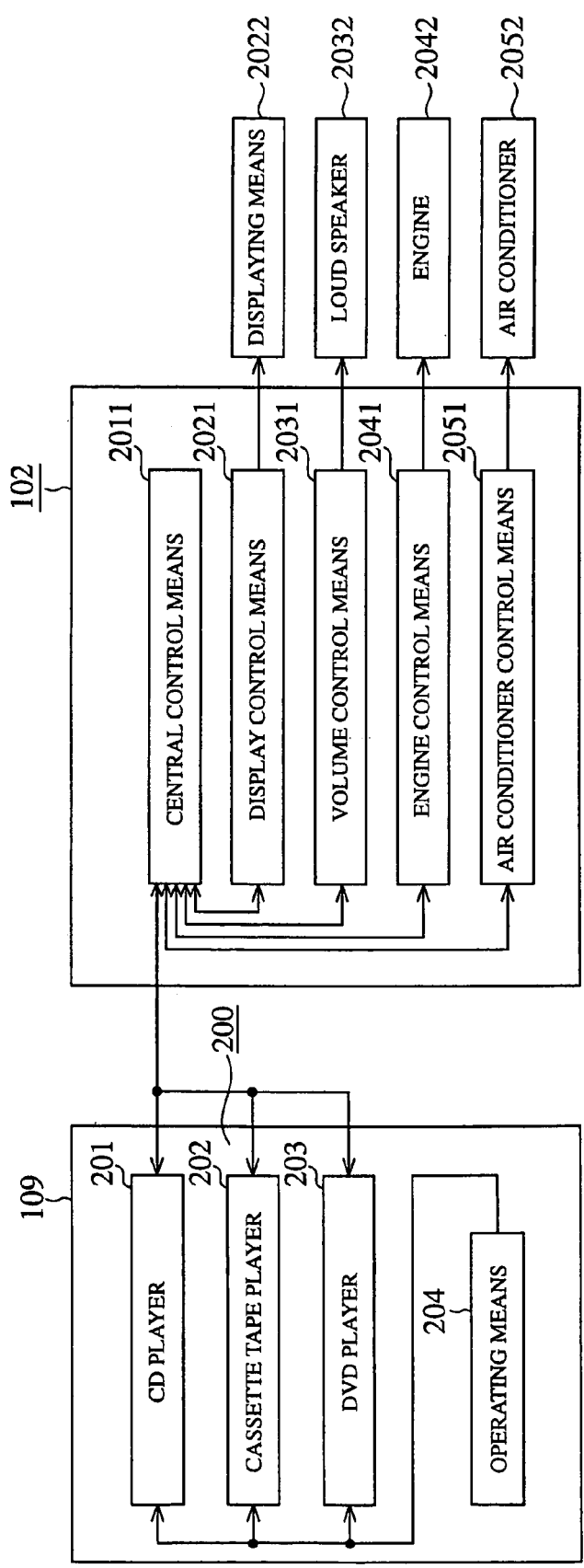
FIG. 2 is a block diagram showing an overall arrangement of the device installation apparatus for a mobile body according to the first embodiment.
Figure 3:
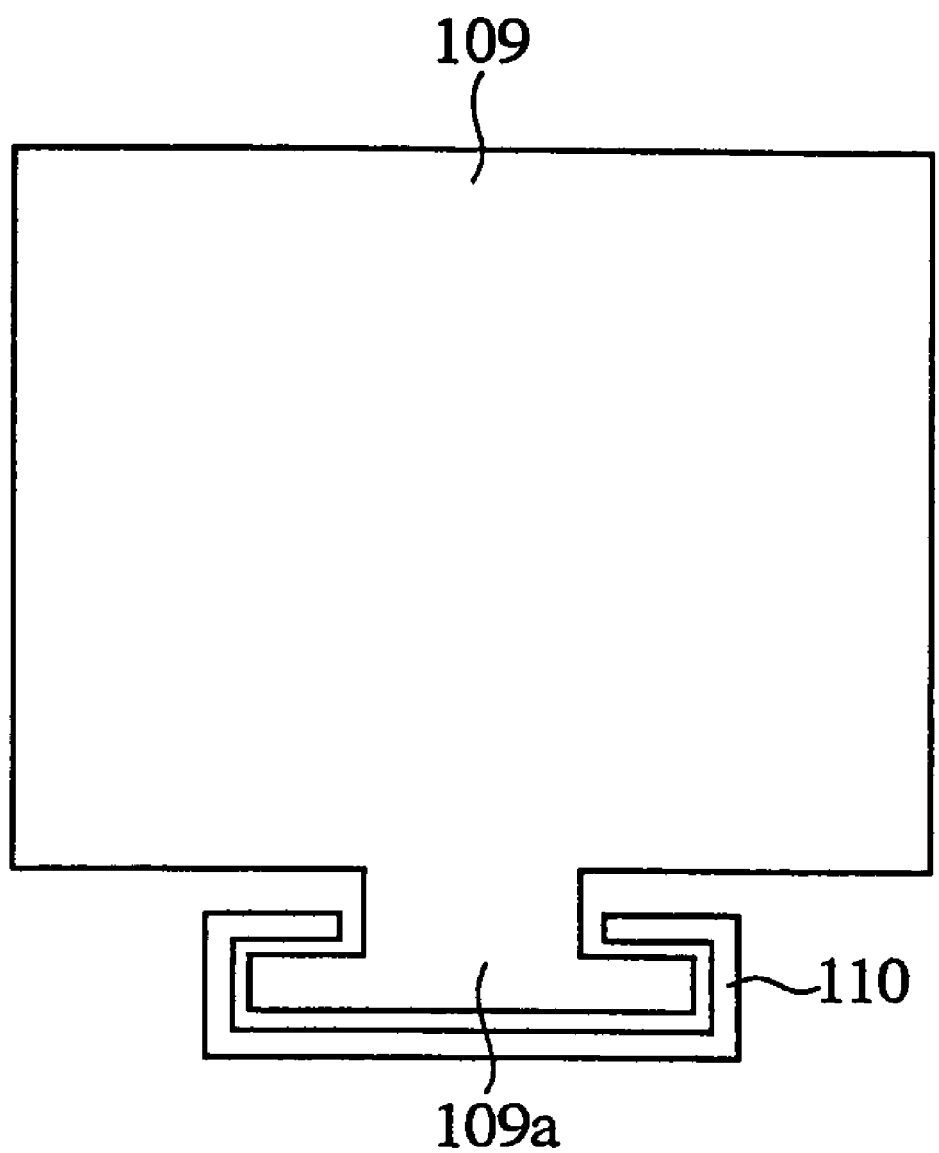
FIG. 3 is a schematic diagram showing an arrangement of a principal portion in FIG. 1.

FIG. 1 is a schematic diagram showing a general arrangement of a device installation apparatus for a mobile body according to the first embodiment. FIG. 2 is a block diagram showing an overall arrangement of the device installation apparatus for a mobile body according to the first embodiment. FIG. 3 is a schematic diagram showing an arrangement of a principal portion in FIG. 1.

In FIGS. 1, 2 and 3, reference numeral 100 denotes an automotive vehicle as a mobile body. In this first embodiment, a description is made based on a 6-passenger mini van type of automotive vehicle. Reference numeral 101 denotes a front glass, reference numeral 102 denotes an instrument panel which is formed by resin or the like and is disposed in a front of a vehicle compartment of the automotive vehicle 100, reference numeral 103 denotes a combination meter panel for disposing therein those meters such as a speedometer, a tachometer or the like which are provided on a side of the driver's seat (to be described later) in the instrument panel 102, and reference numeral 104 denotes a steering wheel.

Further, reference numeral 105 denotes a dash board which forms an upper portion of the instrument panel 102, and reference numeral 106 denotes a glove compartment which is provided on a side of an assistant driver's seat (to be described later) in the instrument panel 102. Further, reference numeral 2800 denotes a display apparatus which is provided in a central portion of the instrument panel 102.

Now, a description will be made about a display apparatus 2800.

Figure 28:
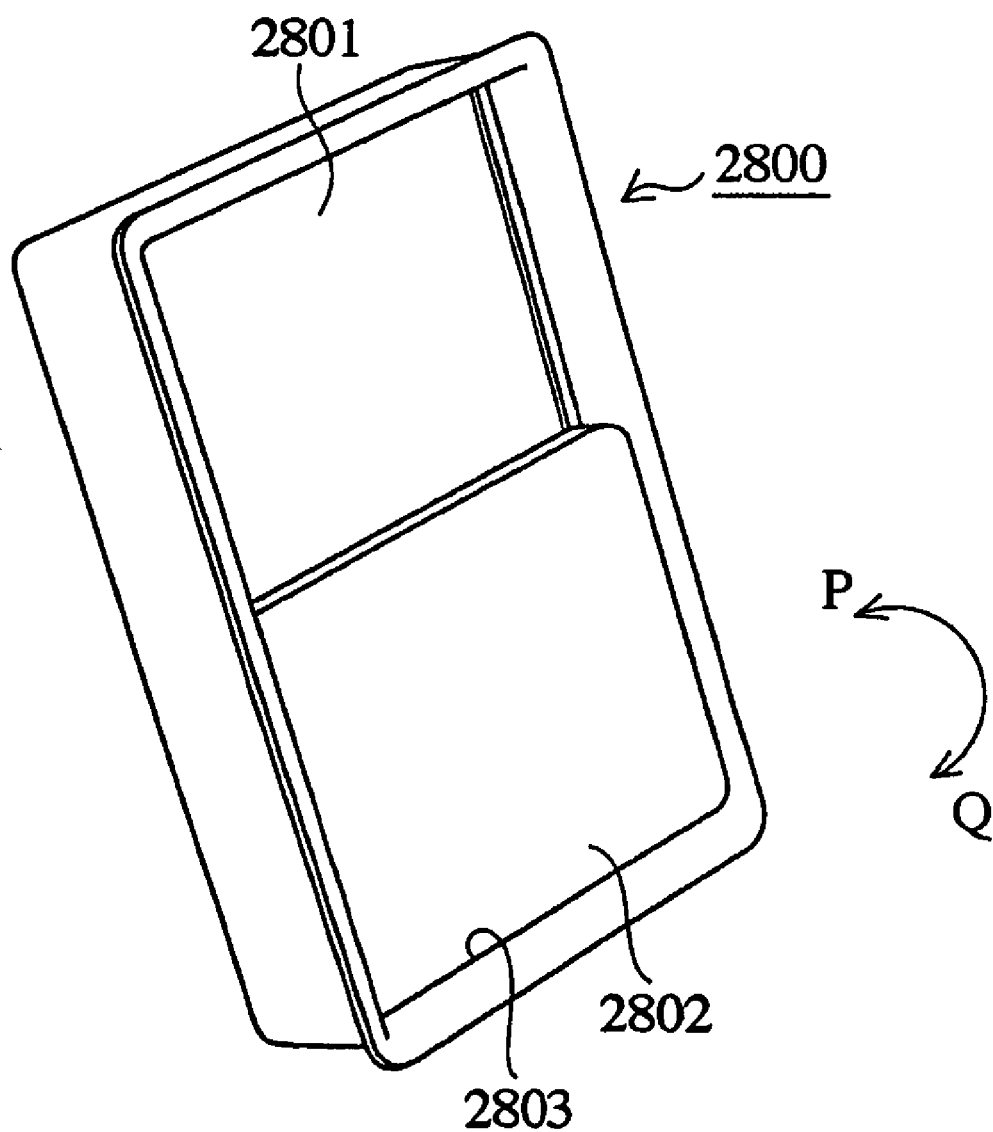
FIG. 28 is a schematic diagram showing a principal portion of a display apparatus according to the first embodiment.
Figure 29:
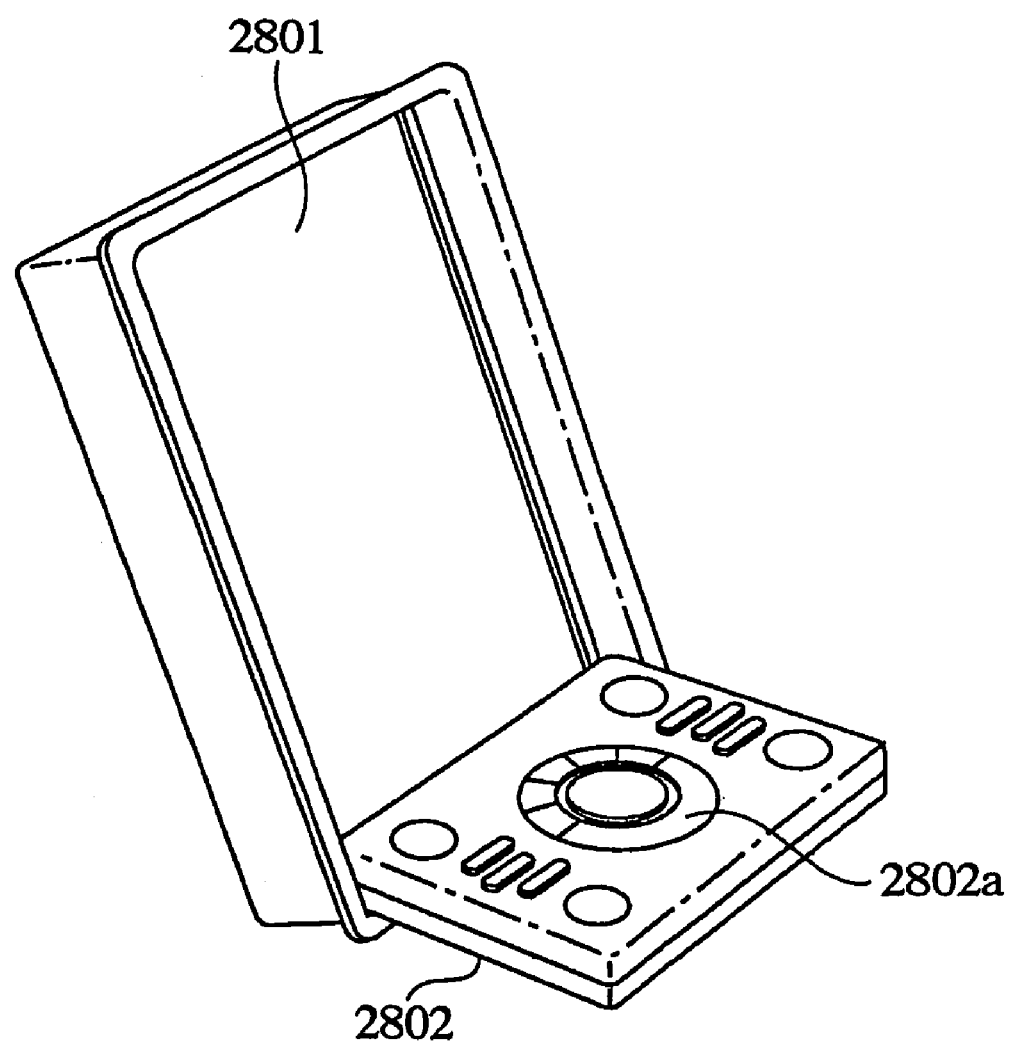
FIG. 29 is a schematic diagram showing a state of the operation when a principal portion in FIG. 28 is operated.
Figure 30:
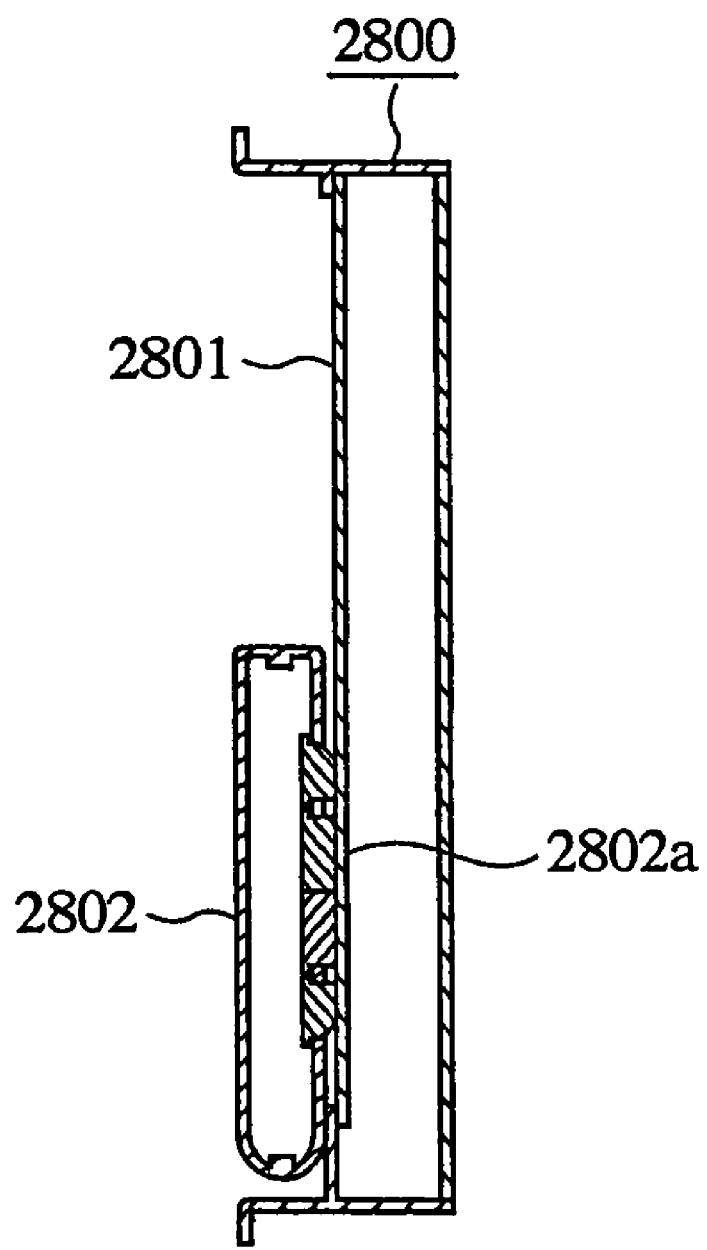
FIG. 30 is a sectional view showing a section of the right side surface in FIG. 28.
Figure 31:
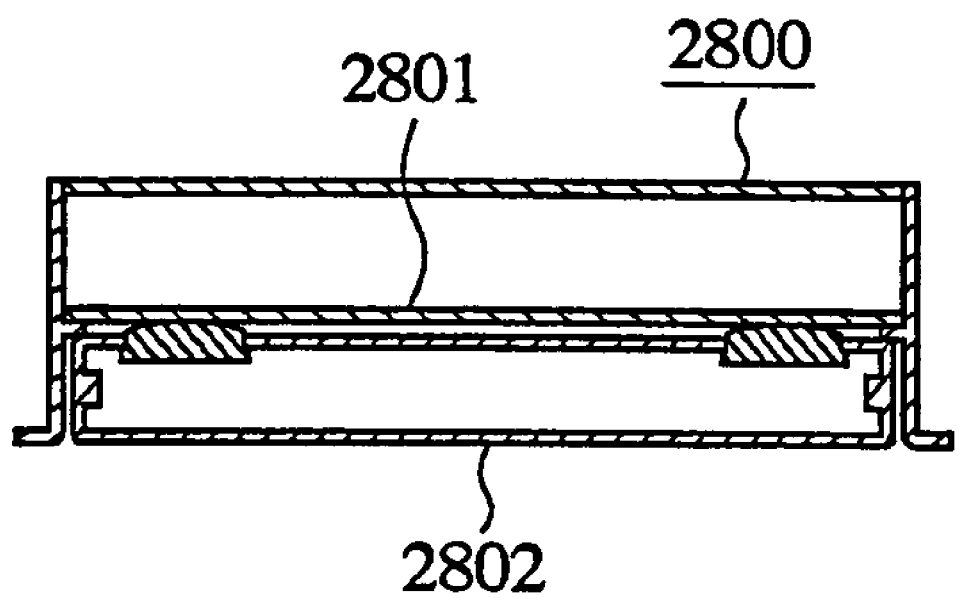
FIG. 31 is a sectional view showing a section of a lower surface of a principal portion in FIG. 28.

FIG. 28 is a schematic diagram showing a principal portion of a display apparatus, FIG. 29 is a schematic diagram showing a state of the operation when a principal portion in FIG. 28 is operated, FIG. 30 is a sectional view showing a section of the right side surface in FIG. 28 and FIG. 31 is a sectional view showing a section of a lower surface of a principal portion in FIG. 28.

In FIG. 28, reference numeral 2800 denotes the display apparatus. This display apparatus 2800 is constituted by a displaying portion 2801 for displaying visual information, and an operating portion 2802 for performing the operation of the display apparatus 2800. In a part of the lower portion of the displaying portion 2801, a rotary shaft 2803 of the operating portion 2802 is provided.

The operating portion 2802 is rotatable in the direction P or Q on the rotary shaft 2803. In housing the operating portion 2802 into the display apparatus, i.e., in folding the operating portion 2802 so that the operating surface of the operating portion 2802 faces the displaying portion 2801, the operating portion 2802 is rotated in the direction P. In putting in the state in which the operation of the operating portion 2802 can be made, i.e., in the condition shown in FIG. 29, the operating portion 2802 is rotated in the direction Q.

By the way, in the state in which the operating portion 2802 is folded as shown in FIG. 28, it is so arranged that the operation of the operating portion 2802 cannot be made.

Then, in FIG. 1, reference numeral 107 denotes front seats. These front seats are constituted by a driver's seat 107a and an assistant driver's seat 107b. Reference numeral 108 denotes passengers seats in an intermediate row. These intermediate seats 108 are constituted, like in the front seats 107, by a seat on the side of the driver's seat 107a, i.e., the right side seat 108a as viewed in FIG. 1 and a seat on the side of the assistant driver's seat 107b, i.e., the left side seat 108b as viewed in FIG. 1.

In addition, behind the intermediate seats 108, rear seats (not shown) are provided. Like in the front seats 107 and the intermediate seats 108, they are also constituted by two seats.

Then, reference numeral 109 denotes a console box as an installing means, which is provided in a position sandwiched between the driver's seat 107a and the assistant driver's seat 107b of the automotive vehicle 100, and in which a desired device 200 such as a compact disc (CD) player 201, a cassette tape player 202, a digital versatile disc (DVD) player 203 or the like can be installed. On a bottom surface of this console box 109 an engaging portion 109a for engaging with a rail portion 110 (to be described later) is provided. In part of the center console box 109, a fixing lever (not shown) is provided for fixing the center console box 109 after having moved it to the predetermined position. This fixing lever is engaged with part of the rail portion 110 when the center console box 109 is fixed to the rail portion 110 and the engagement is released when the center console box 109 is moved.

Reference numeral 110 is the rail portion as a guide means for movably guiding the center console box 109 in the longitudinal direction of the automotive vehicle 100, i.e., in the direction A or B in FIG. 1. This rail portion 110 is formed by cutting part of the floor of the automotive vehicle 100 into a slit. As shown in FIG. 3, it is so arranged that the engaging portion 109a of the center console box 109 slides inside the rail portion 110. By means of the engaging mechanism between the rail portion 110 and the engaging portion 109 of the center console box 109, the center console box 109 is guided along the rail portion 110.

Next, a description is made with reference to FIG. 2 in terms of an overall arrangement of first embodiment.

In the center console box 109 desired devices 200 such as the CD player 201, the cassette tape player 202, the DVD player 203 or the like is disposed. An operating means 204 for operating these devices is further provided.

On the other hand, inside the instrument panel 102 there are provided: a central control means 2011 for supervising the respective control of each device mounted on the automotive vehicle; a display control means 2021 for controlling the displaying means such as a display or the like; a volume control means 2031 for controlling a volume of a loud speaker 2032 which outputs sounds; an engine control means 2041 for controlling the operation of the engine 2042 mounted on the automotive vehicle 100; and an air conditioner control means 2051 for controlling the operation of an air conditioner 2052 mounted on the automotive vehicle 100.

Here, the display control means 2021, the volume control means 2031, the engine control means 2041 and the air conditioner control means 2051 are controlled in response to the operation commands from the central control means 2011. The central control means 2011 performs the predetermined operation controls, e.g., stopping the operation or the like.

A description will now be made about the operation. When a passenger inside the automotive vehicle operates the control means 204, the CD player 201, the cassette tape player 202, the DVD player 203 or the like inside the center console box 109 is operated. For outputting audible information, a command is outputted by the central control means 2011 to the volume control means 2031 to take given control. The volume control means 2031 takes control of the volume to the loud speaker 2032 in response to the command from this control means 2011, thereby outputting a sound from the loud speaker 2032.

For outputting visual information, a command is outputted by the central control means 2011 to the display control means 2021 to take given control. The display control of the displaying means 2022 is taken in response to the command from this central control means 2011, thereby displaying visual information on the displaying means 2022.

Figure 4:
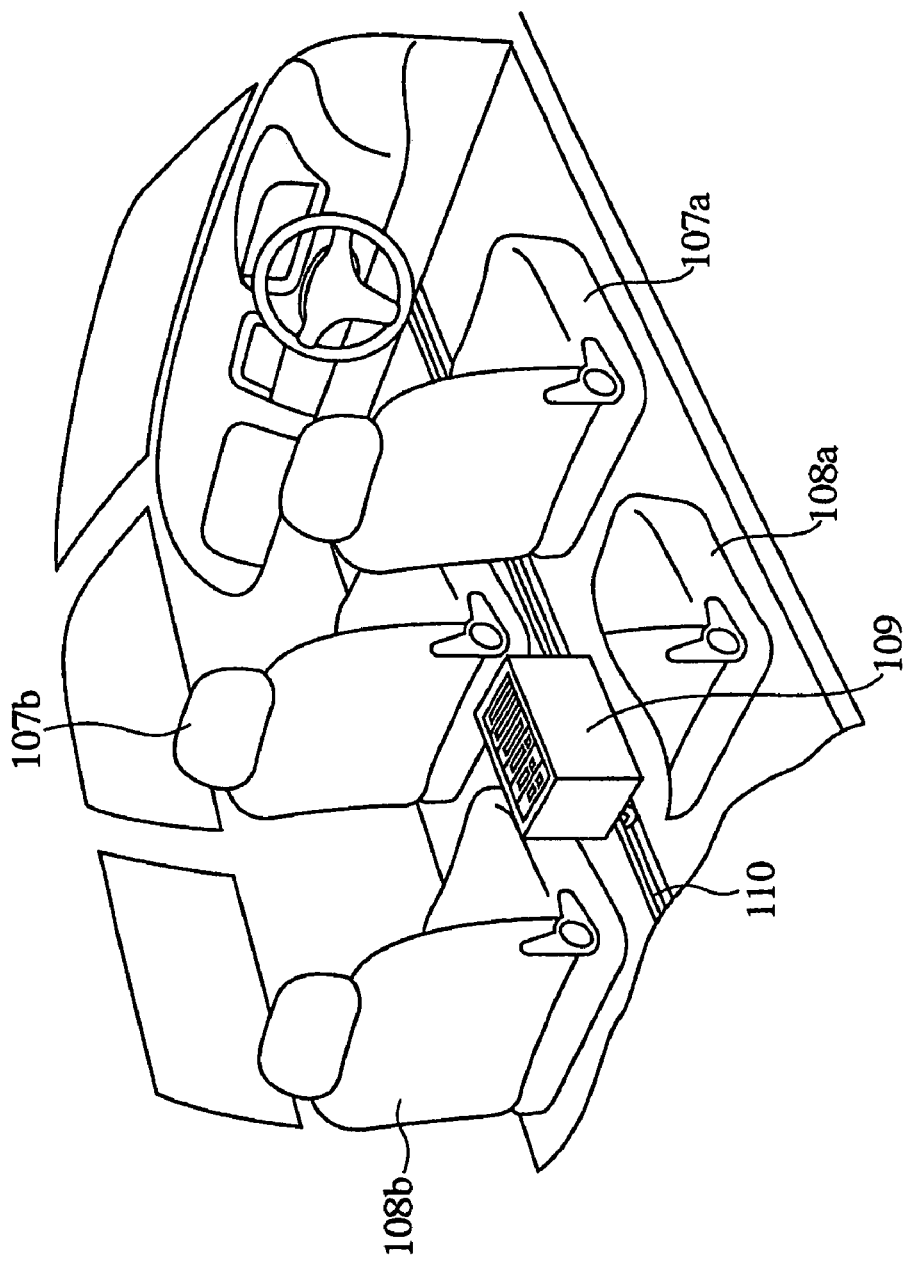
FIG. 4 is a schematic diagram showing a state of the operation of a principal portion.
Figure 5:
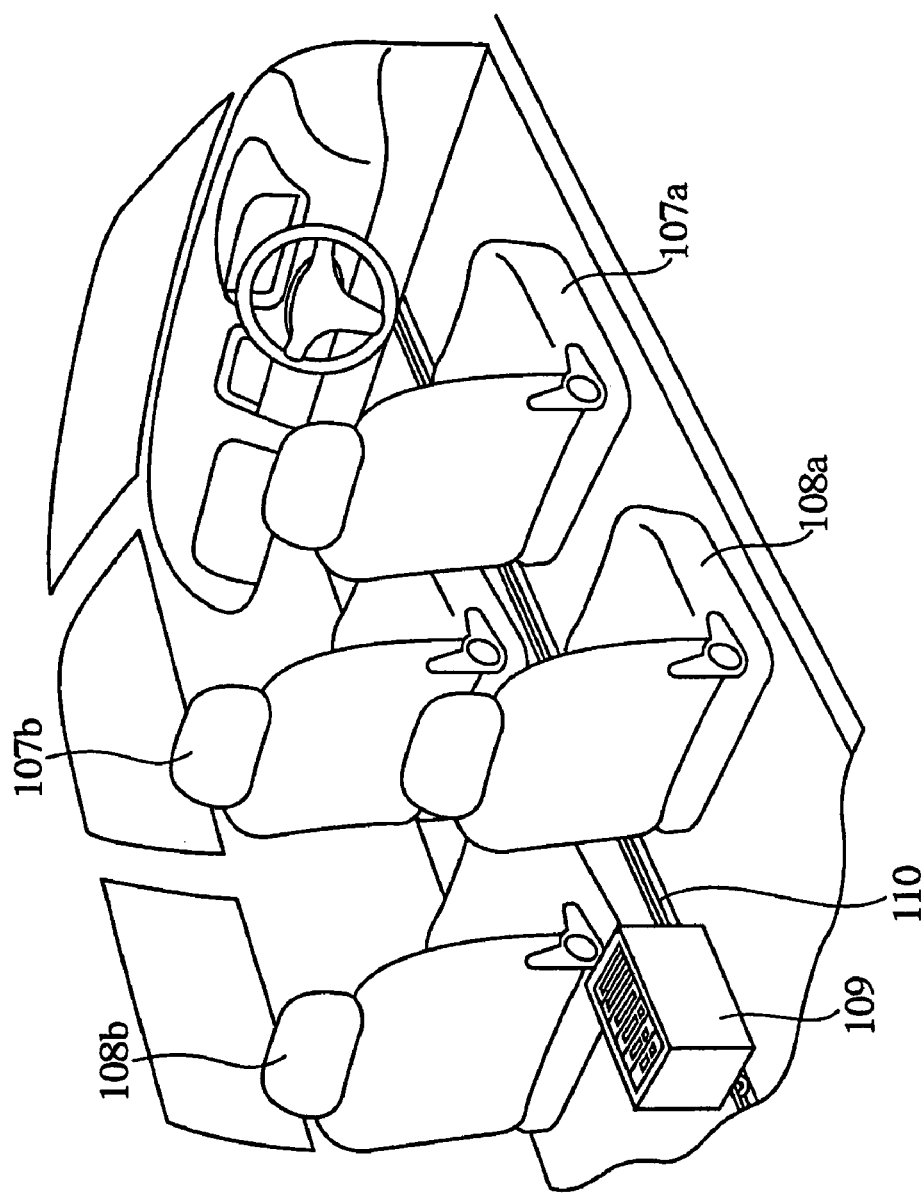
FIG. 5 is a schematic diagram showing a state of the operation of a principal portion.

Next, a description is made about the state in which the center console box 109 moves inside the automotive vehicle 100 with reference to FIGS. 4 and 5.

These FIGS. 4 and 5 respectively show the state in which the center console box 109 is situated corresponding to the intermediate seats 108, and to the rear seats (not shown). When the center console box 109 is moved from the position shown in FIG. 1 in the direction B, it is moved through the position shown in FIG. 4 to the position shown in FIG. 5. When the center console box 109 is moved in the direction A, it is moved in the reverse direction, i.e., from the position shown in FIG. 5 to the position shown in FIG. 1 through the position shown in FIG. 4.

Therefore, as described above, the center console box 109, as the installing means, which is provided in the position sandwiched between the driver's seat 107a and the assistant driver's seat 107b of the automotive vehicle 100, and in which the desired devices 200 as the CD player 201, the cassette tape player 202, the DVD player 203 or the like can be installed is movably along the rail portion 110. Therefore, it becomes possible for the passengers seated other than in the front seats to operate the audio device and the image reproducing device. Particularly, the replacement of memory media such as discs or the like to be inserted into the devices housed inside the center console box 109 by the passengers themselves improves the convenience of the apparatus.

In addition, the movement of the center console box 109 housed therein the audio device and the image reproducing device to a position favorite to the passengers improves the convenience of the user.

In the above description, the first embodiment has been set forth referring to the CD player 201, the cassette tape player 202 and the DVD player 203 as examples of the devices to be housed inside the center console box. Alternatively, it may be provided a game playing device, a personal computer, or other devices quite foreign to the above devices such as a water boiling equipment or the like.

Second Embodiment

A description will be made about a device installation apparatus for a mobile body according to the second embodiment of this invention.

The center console box described in the first embodiment may also be arranged as follows.

Figure 6:
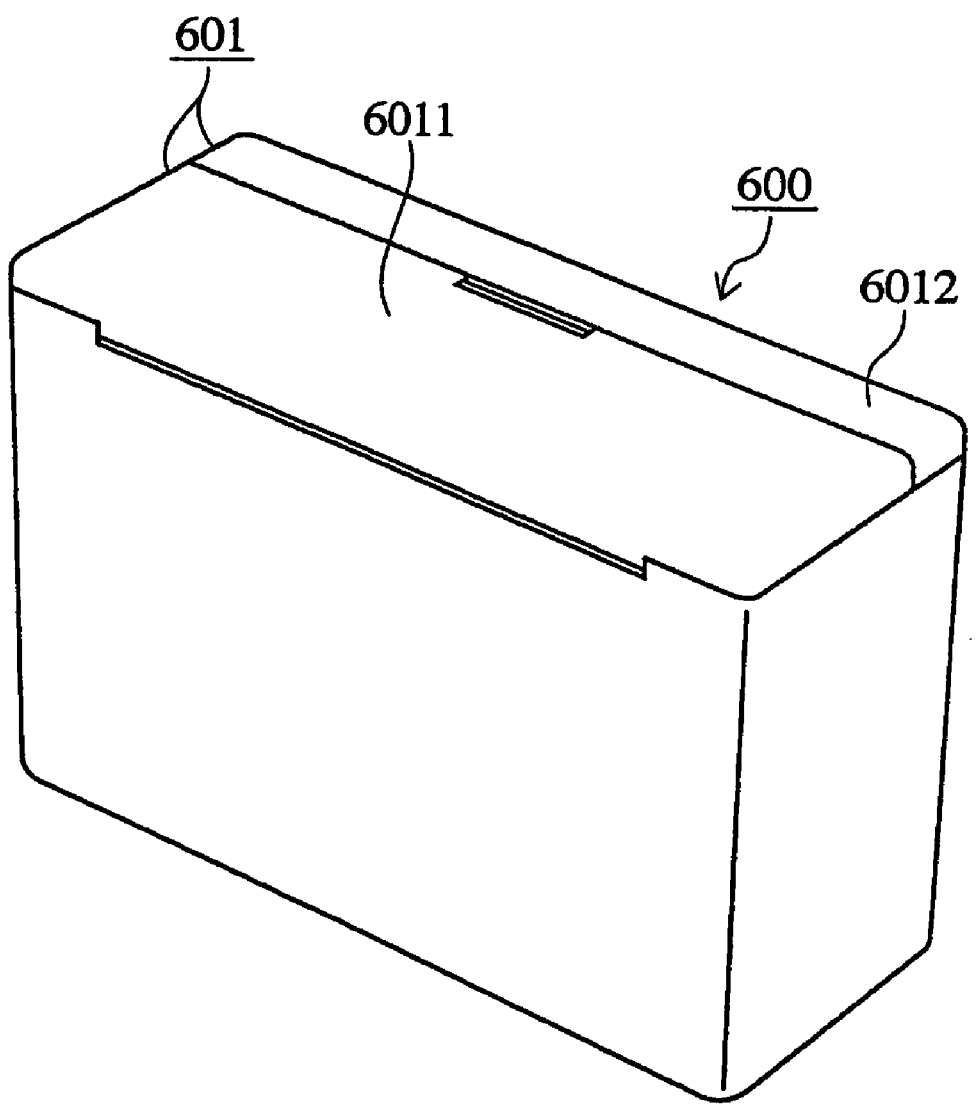
FIG. 6 is a schematic diagram showing an arrangement of a principal portion of a device installation apparatus for a mobile body according to the second embodiment.
Figure 7:
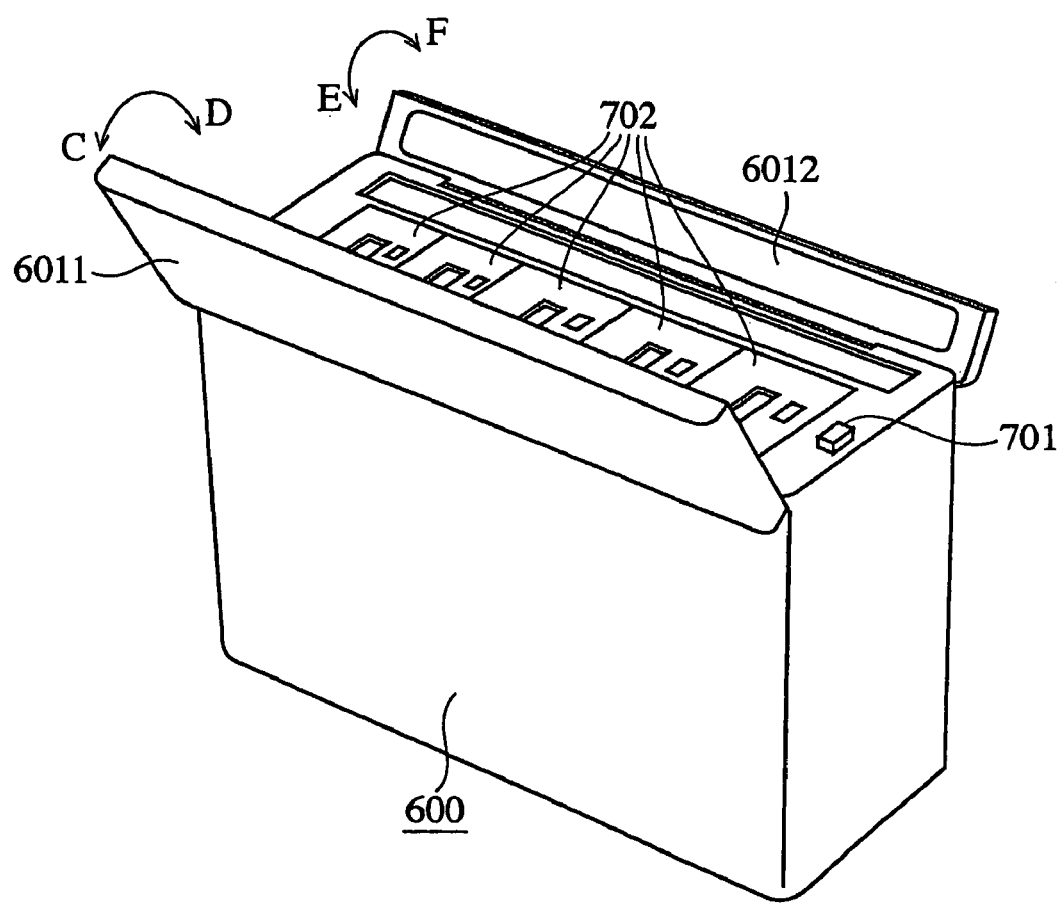
FIG. 7 is a schematic diagram showing the state in which a lid portion is opened changed from the state in FIG. 6.
Figure 8:
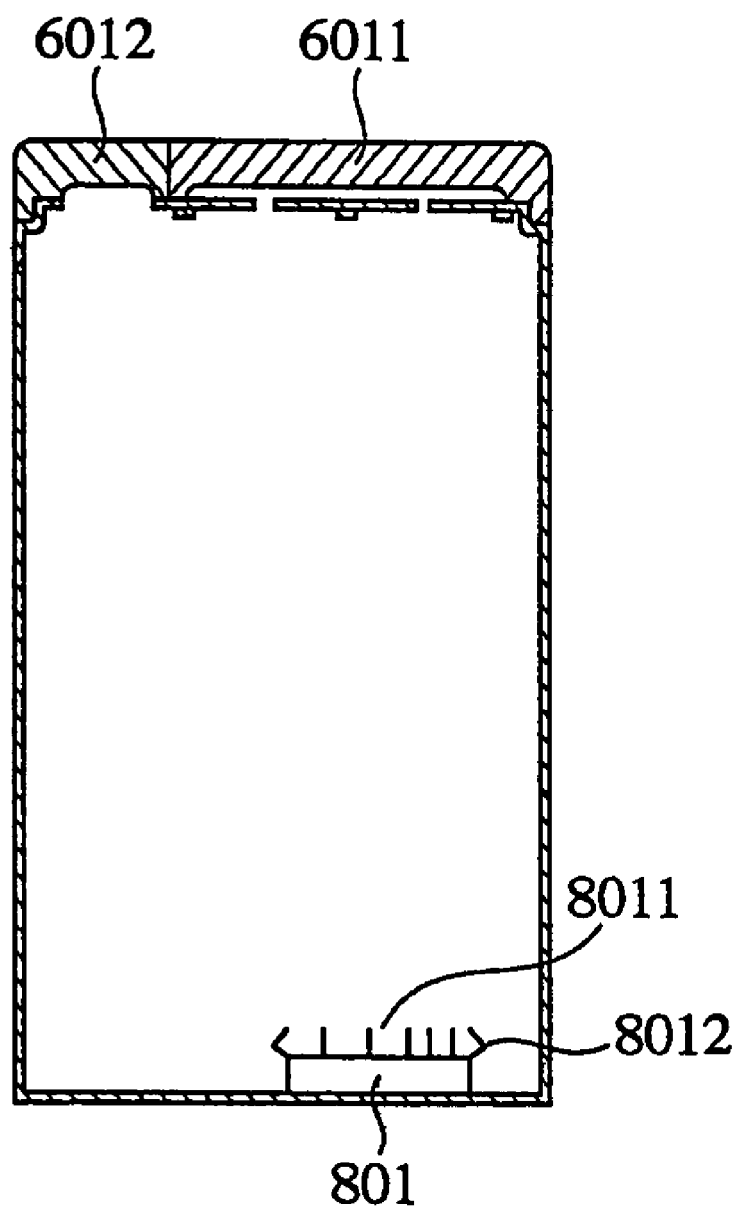
FIG. 8 is a sectional side view showing a side section of FIG. 6.

FIG. 6 is a schematic diagram showing an arrangement of a principal portion of a device installation apparatus for a mobile body according to the second embodiment, FIG. 7 is a schematic diagram showing the state in which a lid portion is opened in FIG. 6, and FIG. 8 is a sectional side view showing a side section of FIG. 6.

In these figures, reference numeral 600 denotes a center console box as an installing means. On an upper portion of this center console box 600, a lid member 601 for the center console box 600 is provided. This lid member 601 is constituted by a left-side lid member 6011 which is disposed on the left side as viewed in the figure, and a right-side lid member 6012 which is disposed on the right side, both of which are independent of each other.

One end portion of a side surface of the center console box 600 serves as an axis of rotation. When the left-side lid member 6011 is to be opened as shown in FIG. 7, it rotates in the direction C and, when it is to be closed, it rotates in the direction D. The right-side lid member 6012 rotates in the direction F when it is opened, and rotates in the direction E when closed.

Reference numeral 701 shown in FIG. 7 denotes a mounting/dismounting release button which is operated by pushing in mounting or dismounting the devices housed inside the center console box 600. The operation of this mounting/dismounting release button 701 allows mounting or dismounting of the devices 702 into and out of the center console box. This enables free replacement of the devices housed inside the center console box.

Further, when the mounting/dismounting release button 701 is operated which is in a state as shown in FIG. 7, the mounting or dismounting of the devices is released.

In addition, reference numeral 801 shown in FIG. 8 denotes a connector as a mounting/dismounting means for detachably holding independently the audio device, the image reproducing device or the like to be housed inside the center console box 600. A plurality of connectors 801 are provided so that a plurality of detachably mounted audio devices, the image reproducing devices or the like can be provided therein.

On a front end 8011 of each of these connectors 801, there are provided pins for: an electric power supply line (not shown) which supplies electric power from a power buttery (not shown) mounted on the automotive vehicle; an audible information outputting line (not shown) which outputs audible information to be outputted from the audio device, the image reproducing device or the like to the central control means 2011 provided inside the instrument panel 102; and a visual information outputting line (not shown) which outputs the visual information. These pins 8011 are arranged such that, when the audio device, the image reproducing device or the like is housed inside the center console box 600, the pins are fit into a connector (not shown) provided on a rear surface of the audio device, the image reproducing device or the like, thereby supplying electric power to the audio device, the image reproducing device or the like, and such that the audible information and the visual information to be outputted from the audio device and the image reproducing device are outputted to the central control means 2011.

Reference numeral 8012 denotes a holding portion for holding the housed audible device and the image reproducing device by holding them when the audio device and the image reproducing device are housed into the center console box 600 and the connectors provided in the audio device and the image reproducing device are fit into the pins 8011. When the audio device or the image reproducing device is to be dismounted from the connector 801 provided inside the center console box 600, the device to be dismounted from the center console box 600 can be pulled up while operating the mounting/dismounting release button 701. Then, the holding portion 8012 is disengaged from the connector provided in the device with the help of this pulling-up force.

Therefore, by providing the connector 801 inside the center console box 600 as described above, when the audio device or the image reproducing device is housed inside the center console box 600, the connectors provided in the audio device and the image reproducing device and the connectors 801 inside the center console box 600 are fit with each other to hold the audio device and the image reproducing device, and each of these devices can be dismounted from the connector 801. Therefore, the devices to be housed inside the center console box 600 can be freely replaced. In other words, even if a failure or the like is occurred in the devices, the devices can easily be removed because they are not fixed by means of screws or the like, so that the maintenability of the apparatus is thus improved. Further, the easy operation of the apparatus improves the freedom in design of the apparatus as a system.

Third Embodiment

A description will be made about of a device installation apparatus for a mobile body according to the third embodiment of this invention.

In the above second embodiment of this invention, the device that can be housed inside the center console box 600 has been set forth. Alternatively, it may also be housed therein only one device. Arranging in this manner the same effect is obtained that the device to be housed inside the center console box 600 can easily be replaced.

Forth Embodiment

A description will be made about a device installation apparatus for a mobile body according to the forth embodiment of this invention.

In the above first embodiment, the electric power supply line, the audible information output line, the visual information output line or the like is used for connection between the audio device, the image reproducing device or the like housed in the center console box 109 and the central control means 2011 provided inside the instrument panel 102 have been set forth. Alternatively, a communication network may be established between them using, for example, the technology of "Bluetooth" which has recently been become the main current.

Here, a brief description will be made aboutu the "Bluetooth" technology.

As described in No. 759 (issued Dec. 13, 1999) of a publication entitled "NIKKEI ELECTRONICS," "Bluetooth" is a wireless interface using as a carrier frequency an Industrial Scientific Medical (ISM) band of 2.4 GHz requiring no licence, and it uses a spread spectrum technology based on frequency hopping method.

There are three classes in the transmission outputs of radio waves, in which class 1 is +20 dBm (maximum transmission distance is 100 m), class 2 is +4 dBm, and class 3 is 0 dBm (maximum transmission distance is 10 m).

Here, since class 1 requires an externally mounted power amplifier circuit, ordinarily, class 2 or class 3 will have to be considered.

By using this "Bluetooth" technology, a maximum of 7 devices can be connected to a network.

Figure 9:
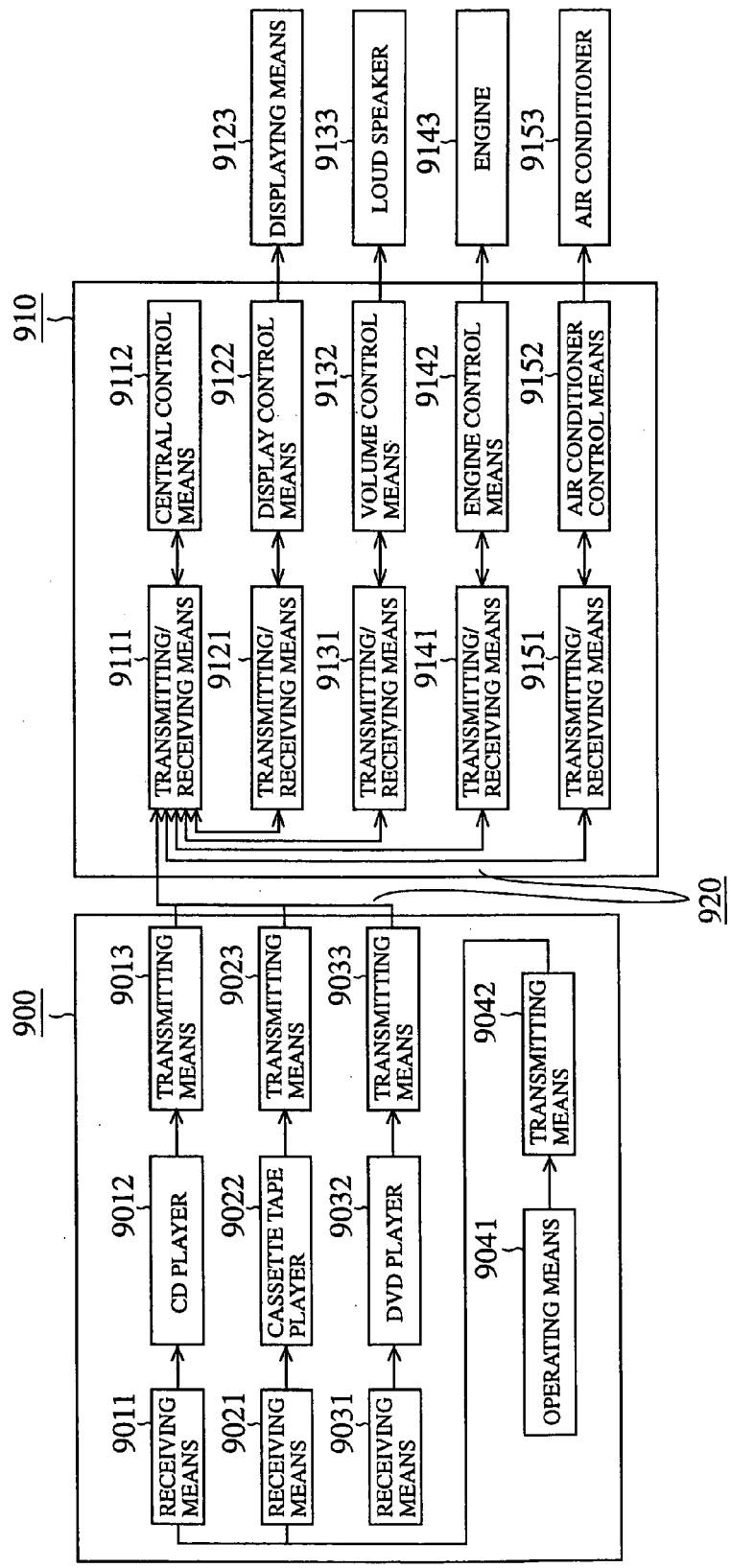
FIG. 9 is a block diagram showing an overall arrangement of the device installation apparatus for a mobile body according to the forth embodiment.

FIG. 9 is a block diagram showing an overall arrangement of the device installation apparatus for a mobile body according to the fourth embodiment of this invention. It shows a center console box 900, an inside of an instrument panel 910, using the above "Bluetooth" technology, i.e. an onboard local area network (LAN) 920.

Inside the center console box 900, they are provided an operating means 9041, a CD player 9012, a cassette tape player 9022, and a DVD player 9032 which are operated by this operating means. Further, there are provided: a transmitting means 9042 for transmitting an operation command of the operating means 9041; a receiving means 9011 complied with the CD player 9012 for receiving the transmitted signal of this transmitting means 9042; a receiving means 9021 complied with the cassette tape player 9022; a receiving means 9031 complied with the DVD player 9032; a transmitting means 9013 for transmitting an output signal of the CD player 9012; a transmitting means 9023 for transmitting an output signal of the cassette tape player 9022; and a transmitting means 9033 for transmitting an output signal of the DVD player 9032.

Here, the transmitting means 9013, 9023, 9033 receive the signals transmitted from the transmitting means 9111, and output an operation command to each device.

Then, a description will be made about the operation.

First, in case the CD player 9012 operated by the operating means 9041, the receiving means 9011 of the CD player 9012 receives an operation command in response to the operation command of the operating means 9041 through the transmitting means 9042. When the operation command is received by this receiving means 9011, the CD player 9012 outputs audible and visual information. The signal outputted from this CD player 9012 is transmitted by the transmitting means 9013 and received by a transmitting/receiving means 9111 provided inside of the instrument panel 910.

Similarly, in case of the cassette tape player 9022 and the DVD player 9032, when the operation command from the operating means 9041 is received, the receiving means 9021 or the receiving means 9031 receives the operation command through the transmitting means 9042. When this receiving means 9021 or the receiving means 9031 is received the operation command, the cassette tape player 9022 or the DVD player 9032 operates to output audible information or the visual information. This output signal is transmitted by the transmitting means 9023 or the transmitting means 9033 and received by the transmitting/receiving means 9111 of the central control means 9112 provided inside of the instrument panel 910.

Then, the central control means 9.112 provided inside of the instrument panel 910 takes display control of the visual information through the transmitting/receiving means 9121 if the visual information is included in the signal received by the transmitting/receiving means 9111, thereby outputting the information to the displaying means 9123 for displaying on the displaying means 9123.

In addition, the central control means 9112 takes control of volume of the audible information by the volume control means 9132 through the transmitting/receiving means 9111 if the audible information is included in the signal received by the transmitting/receiving means 9111, thereby outputting the information to a loud speaker 9133 for outputting a sound from the loud speaker 9133.

Inside the instrument panel 910, there is provided, as another arrangement, an engine control means 9142 for controlling an engine 9143 mounted on the automotive vehicle. This engine control means 9142 is provided with a transmitting/receiving means 9141 for receiving the signal transmitted from the transmitting/receiving means 9111 in the central control means 9112.

There is further provided an air conditioner control means 9152 for controlling an air conditioner 9153 mounted on the automotive vehicle. This air conditioner control means 9152 is provided with a transmitting/receiving means 9151 for receiving a signal transmitted from the transmitting/receiving means 9111 in the central control means 9112.

Furthermore, the above transmission line is constituted as an onboard LAN 920.

In other words, in order to configure the above network, each of the audio devices and the image reproducing devices is provided with a transmitting/receiving means adopting the ISM band of 2.4 GHz. The central control means 9112 provided inside the instrument panel 910 is also provided with the transmitting/receiving means 9111 adopting the ISM band of 2.4 GHz to build a system using a wireless type of transmitting/receiving means.

Conventionally, although the audio device and the image reproducing device as well as wiring materials such as an electric power supply line, audible information output line or the like are used to take control of these devices, the wiring materials are no more required. As a result, since the wiring space under the floor can be reduced, the floor inside the center control box can be constructed in a clear way. Furthermore, since a plurality of devices can be networked, each device can centrally be controlled and the freedom in design can be improved. In the above fourth embodiment, the "Bluetooth" was used as the wireless technology. Alternatively, as an infrared-ray type of wireless technology, an IrDA type may also be used. By arranging in this manner, the wiring materials such as the electric power supply line, the visual information outputting line, the audible information outputting line or the like that were conventionally used to connect the devices are not required any more. As a consequence, an effect is obtained that the wiring space under the floor can be reduced.

Fifth Embodiment

A description will be made about a device installation apparatus for a mobile body according to the fifth embodiment of this invention.

In the above first through fourth embodiments, the arrangements in which an operation of the audio device or the image reproducing device housed in the center console box are opened to anybody. Alternatively, the operation may be opened only to the restricted user.

Figure 10:
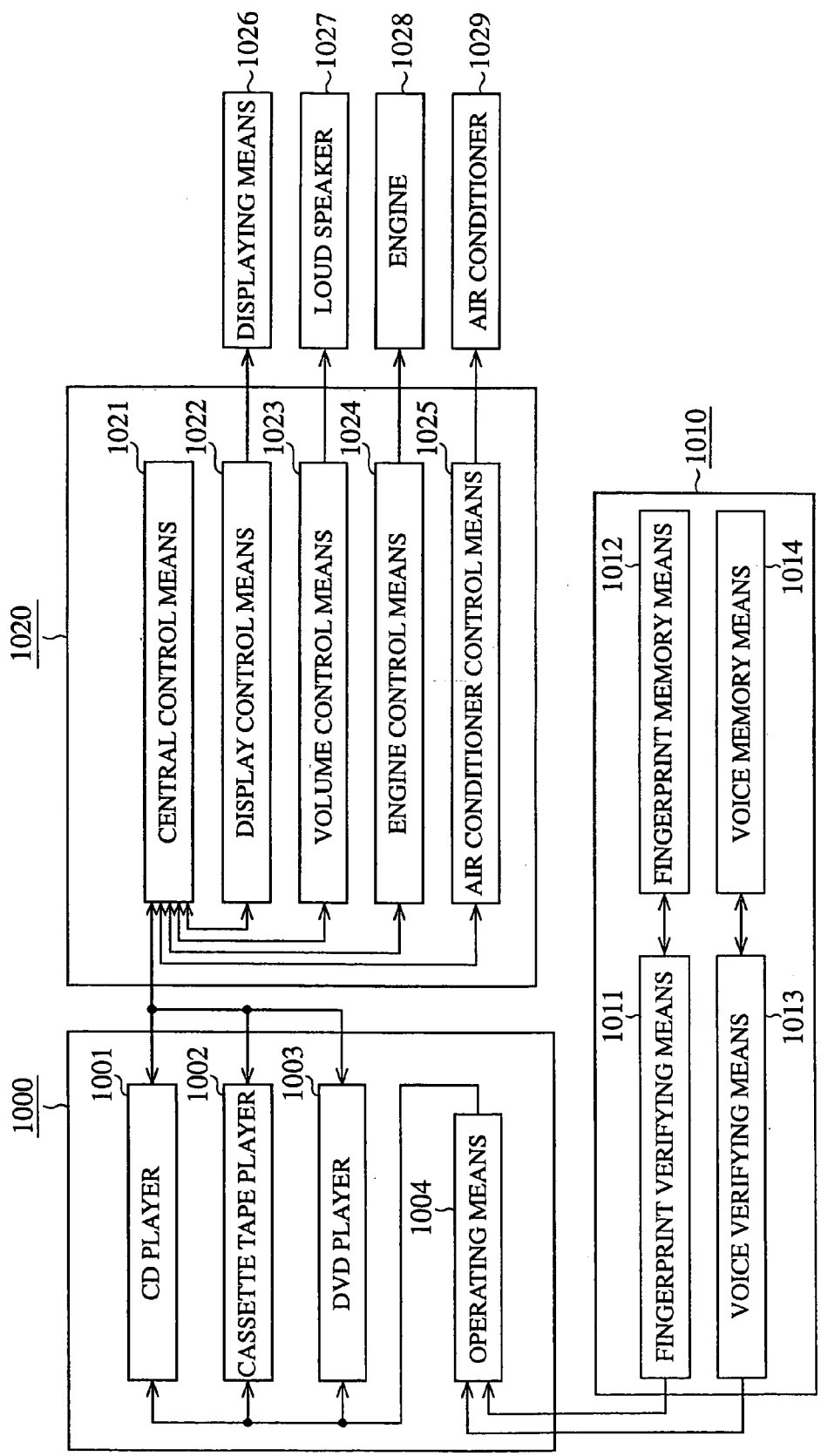
FIG. 10 is a block diagram showing an overall arrangement of a device installation apparatus for a mobile body according to fifth embodiment.
Figure 11:
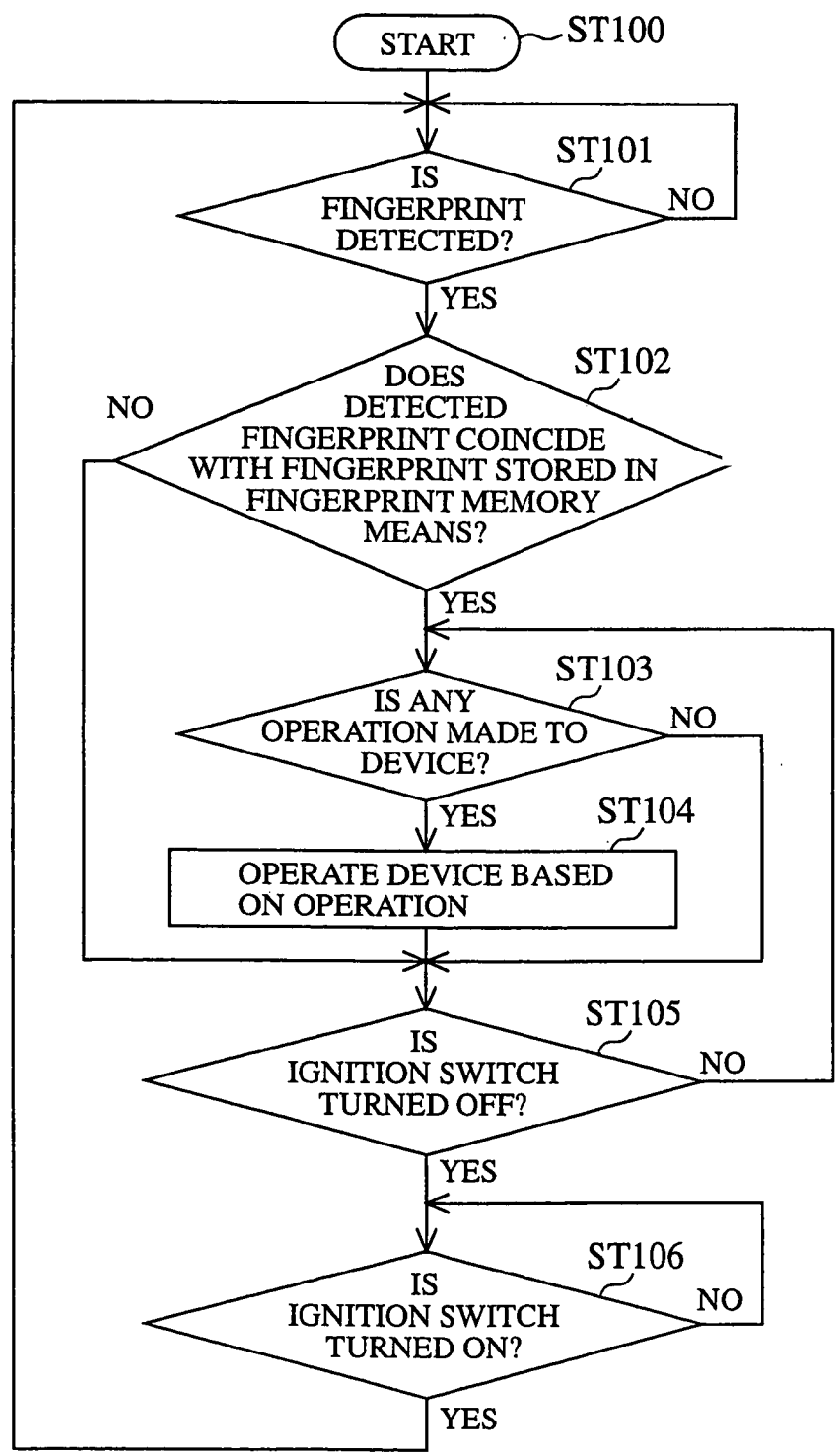
FIG. 11 is a flow chart showing the operation of FIG. 10.

FIG. 10 is a block diagram showing an overall arrangement according to the fifth embodiment, and FIG. 11 is a flow chart showing the operation of FIG. 10.

A description will first be made about the arrangement with reference to FIG. 10.

Reference numeral 1000 denotes a center console box. Inside this center console box 1000, a CD player 1001, a cassette tape player 1002 and a DVD player 1003 are provided. An operating means 1004 is provided for performing the predetermined operations of these devices.

In addition, on a part of the periphery of the center console box 1000, a user judging means 1010 for is provided judging whether a user of the apparatus is an appropriate user or not. This user judging means 1010 is arranged such that, only when the means 100 has judged the user to be an appropriate, the operation of the audio device and the image reproducing device housed in the center console box is permitted.

In addition, the user judging means 1010 is provided with a fingerprint verifying means 1011 for judging whether the user is an appropriate user or not by verifying the user's fingerprint, and a voice verifying means 1013 for judging whether the user is an appropriate user or not by verifying the voices pronounced by the user. The fingerprint verifying means 1011 is provided with a fingerprint memory means 1012 for storing in advance the fingerprint information of the user to be compared with user's fingerprint when the fingerprint verification is done. Further, the voice verifying means 1013 is provided with a voice memory means 1014 for storing in advance the voice information of the user to be compared with user's voice when the voice verification is done.

Inside the instrument panel 1020 there are provided: a central control means 1021 for taking overall control of all the devices mounted on the automotive vehicle; a display control means 1022 for controlling the displaying means 1026 such as a display or the like; a volume control means 1023 for controlling the volume of the loud speaker 1027 which outputs a sound; an engine control means 1024 for controlling the operation of an engine 1028 mounted on the automotive vehicle; and an air conditioner control means 1025 for controlling the operation of an air conditioner 1029 mounted on the automotive vehicle.

Here, the display control means 1022, the volume control means 1023, the engine control means 1024 and the air conditioner control means 1025 are controlled in response to the operation command from the central control means 1021. The central control means 1021 performs the predetermined operation, e.g., stopping of operation or the like, of each device housed inside the central console box 1000.

Now, a description will be made about the operation with reference to FIG. 11.

First, once an ignition switch of the automotive vehicle is turned on (step 100), when a user wishes to play the CD player 1002, the cassette tape player 1002 or the DVD player 1003 housed in the center console box 1000, the operator, i.e., the user pushes his or her finger against the fingerprint verifying means 1011 so as to detect his or her fingerprint.

As a result, once the fingerprint verifying means 1011 has judged to have detected the fingerprint (step 101), the fingerprint verifying means 1011 reads out from the fingerprint memory means 1012 the fingerprint that has been stored in advance by the approved user and makes a comparison with the fingerprint detected at step 101. If the two fingerprints have judged to coincide with each other as a result of comparison (step 102), the user can gain access to each of the devices housed in the center console box 1000.

In this state, if the operation of the operating means 1004 has made to any one of the devices (step 103), each of the devices is operated based on this operation (step 104).

After having executed this step 104, if the ignition switch is turned off, the operation of each of the devices housed in the center console box 1000 is prohibited. Unless a fingerprint verification is done once again, and judged the intended user to be the appropriate user, the devices are set to an inoperable state (step 105).

After having this step 105, when the ignition switch is turned on, the procedure returns to step 101 to get into a wait condition to make a judgement as to whether the fingerprint verifying means 1011 has detected a fingerprint or not (step 106). The same processing is repeated after step 102.

Here, when a fingerprint has not detected at step 101, it will again get into a wait condition for the fingerprint detection, and the procedure returns to step 101.

Further, in case at step 102 the fingerprint verifying means 1011 has judged that the detected fingerprint does not coincide with the fingerprint that has been stored in the fingerprint storing means 1012, the procedure proceeds to step 105 if no operation is made at step 103 to the device housed in the center console box 1000 even after the predetermined time elapsed. It will get into a wait condition for the ignition switch to be turned off.

Further, if the ignition switch is not turned off at step 105, the procedure returns to step 103 and will get into a wait condition for the operation of the devices.

Furthermore, if the ignition switch is not turned on at step 106, the procedure returns again to step 106. It will get into a wait condition for the ignition switch to be turned on.

Therefore, when the fingerprint of the user does not coincide with the fingerprint that has been stored in advance as described above, the user is prohibited from being accessed to the devices housed in the center console box. In this manner, a restriction on the user can be imposed. For example, the imposition of such restriction on the user leads to the prevention of the operating means from being tampered by children, or to the protection of the devices from being stolen, resulting in an improvement in the convenience of the apparatus.

Sixth Embodiment

A description will be made about a device installation apparatus for a mobile body according to the sixth embodiment of this invention.

In the above fifth embodiment, the restriction of the user is imposed on the audio device or the image reproducing device housed in the center console box by using the user judging means, in case each device is detachably from the center console box, it may also be imposed the restriction, aside from it on the operation of each device, and on the mounting and dismounting of each device.

Figure 12:
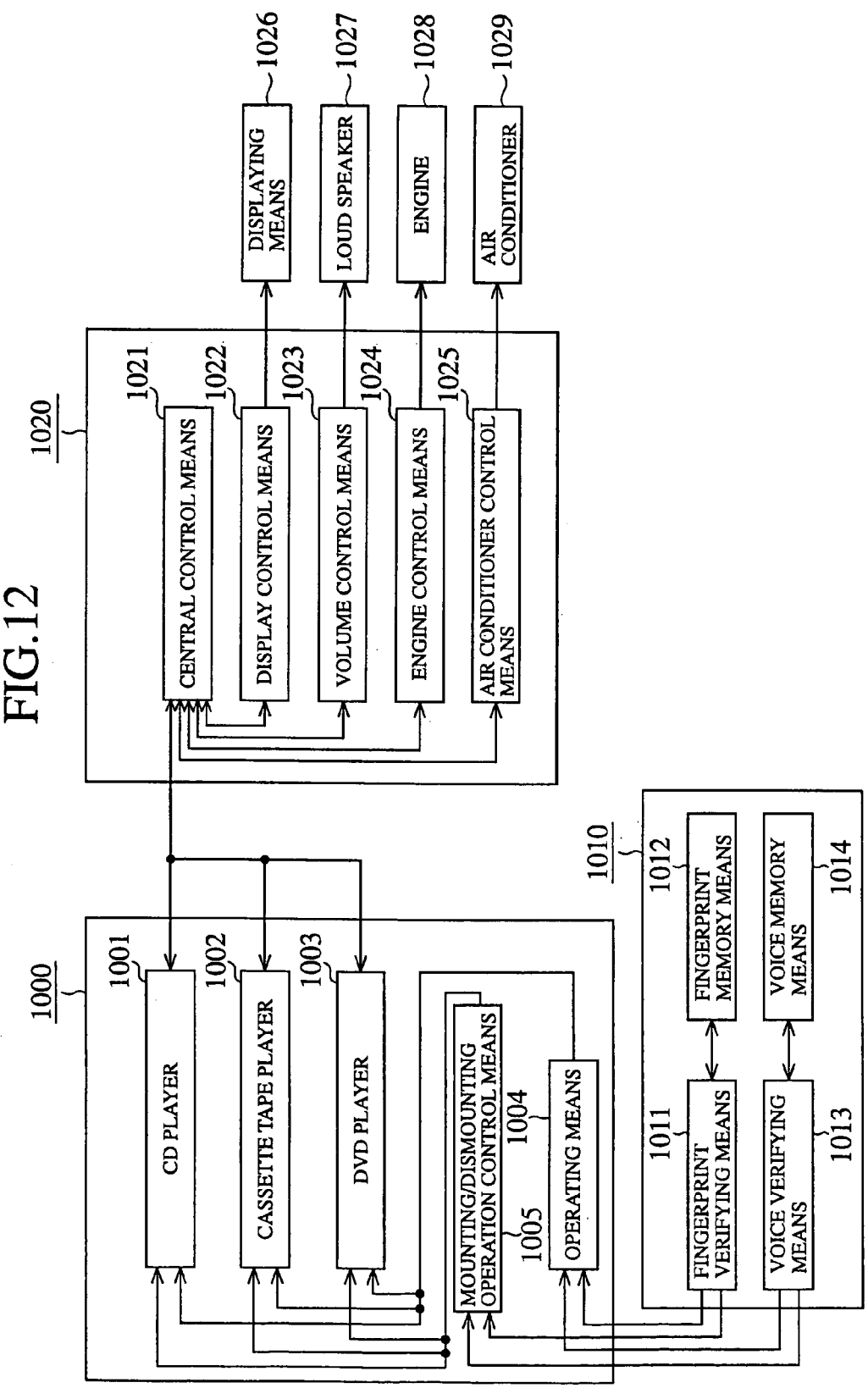
FIG. 12 is a block diagram showing an overall arrangement of a device installation apparatus for a mobile body according to the sixth embodiment.
Figure 13:
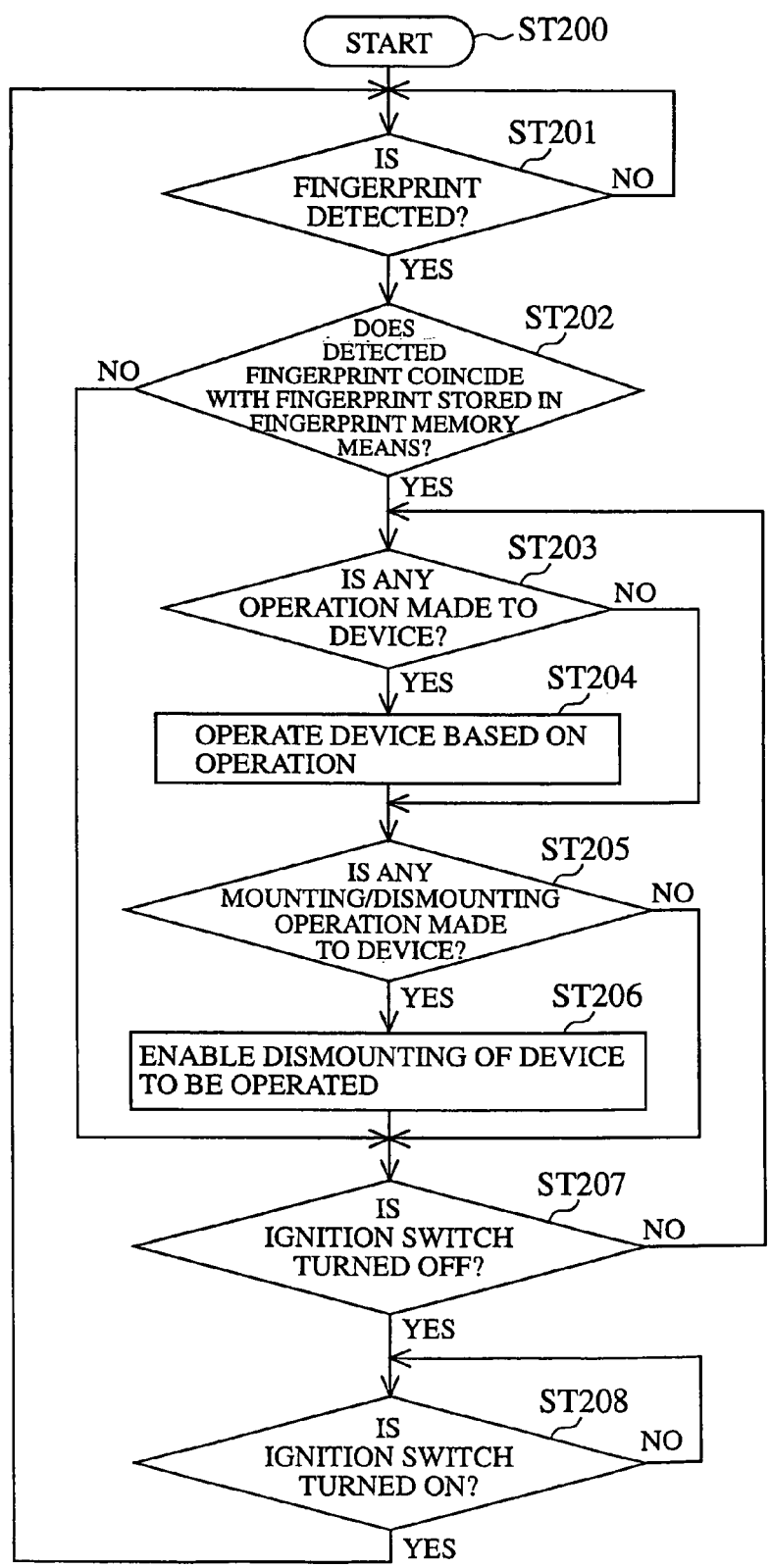
FIG. 13 is a flow chart showing the operation of FIG. 12.

FIG. 12 is a block diagram showing an overall arrangement according to the sixth embodiment, and FIG. 13 is a flow chart showing the operation of FIG. 12.

First, a description is made about the construction with reference to FIG. 12.

The same reference numerals are used to denote the same elements in FIG. 10, and therefore descriptions thereof are omitted.

Reference numeral 1005 denotes a mounting/dismounting operation control means for imposing a restriction as to whether the mounting or dismounting operations of the CD player 1001, the cassette tape player 1002 and the DVD player 1003 housed in the center console box 1000 will be allowed or not based on the result of judgement by the user judging means 1010.

Then, a description of the operation will be made with reference to FIG. 13.

First, once the ignition switch of the automotive vehicle is turned on (step 200), when a user wishes to play the CD player 1002, the cassette tape player 1002 or the DVD player 1003 housed in the center console box 1000, the operator, i.e., the user pushes his or her finger against the fingerprint verifying means 1011 so as to detect his or her fingerprint.

As a result, once the fingerprint verifying means 1011 has judged to have detected the fingerprint (step 201), the fingerprint verifying means 1011 reads out from the fingerprint memory means 1012 the fingerprint that has been stored in advance by the approved user and makes a comparison with the fingerprint detected at step 201. If the two fingerprints have judged to coincide with each other as a result of comparison (step 202), the user can gain access to each of the devices housed in the center console box 1000.

In this state, if the operation of the operating means 1004 has made to any one of the devices (step 203), each of the devices is operated based on this operation (step 204).

Then, if the mounting/dismounting operation means 701 shown in FIG. 7 is operated to any of the devices (step 205), the mounting/dismounting control means 1005 makes it possible, based on this operation, to dismount the device to be mounted on or dismounted from the center console box 1000 (step 206).

After having executed this step 206, if the ignition switch is turned off, the operation of each of the devices housed in the center console box 1000 gets in a prohibited state, and the mounting/dismounting operation of each device is also set to this state. Unless fingerprint verification is done once again and judged the intended user to be an appropriate user, each devise is set to an inoperable and unmounting/undismounting state (step 207).

After having executed this step 207, if the ignition switch is turned on, the procedure returns to step 201 to get into a state to make a judgement as to whether the fingerprint control means 1011 has detected a fingerprint or not (step 208). The same processing is repeated after step 202.

Here, if a fingerprint has not detected at step 201, it will again get into a wait condition for the fingerprint detection, and the procedure returns to step 201.

Further, in case at step 202 the fingerprint verifying means 1011 has judged that the detected fingerprint does not coincide with the fingerprint that has been stored in the fingerprint storing means 1012, the procedure proceeds to step 207 if no operation is made at step 205 to the device housed in the center console box 1000 even after the predetermined time elapsed. The state will thus get into a wait condition for the ignition switch to be turned off.

Further, if no operation is made to the device housed in the center console box 1000 after the predetermined time elapsed, the procedure proceeds to step 205, and the state will be get into a wait condition for the mounting/dismounting operation of each device.

Further, if the ignition switch is not turned off at step 207, the procedure returns to step 203 and the state will get into a wait condition for the operation of the device.

Furthermore, if the ignition switch is not turned on at step 208, the procedure returns again to step 208. The state will thus get into a wait condition for the ignition switch to be turned on.

Therefore, as a result of comparison of the fingerprint of the user, if revealed that it does not coincide with the fingerprint that has been stored in advance as described above, the user access is prohibited to prevent the devices housed in the central console box 1000 from being operated, and to prevent each of the devices housed in the center console box from being dismounted. The restriction of the dismounting of the devices ensures the further prevention of the tampering and the theft.

As a method for prohibiting the mounting or the dismounting of the devices housed in the center console box 1000, a method is employed for disabling the mounting or dismounting operation by canceling the above operation even if the mounting/dismounting release button 701 shown in FIG. 7 is operated.

Seventh Embodiment

A description will be made about a device installation apparatus for a mobile body according to another seventh embodiment of this invention.

In the above fifth and sixth embodiments, a fingerprint verifying means is used as the user judging means. Alternatively, voice verifying means may be used in judging the user. In this case, this arrangement is expected to have an effect equivalent to that in fifth and sixth embodiments.

Further, as the user judging means, both the fingerprint verifying means and the voice verifying means are provided. Alternatively, only one of them may be provided. In addition, both may be provided so that an appropriate user can be judged by using the results of judgement of both. The above arrangements contribute to restriction of the user, and to further improvement in the accuracy of the apparatus.

Eighth Embodiment

A description will be made about a device installation apparatus for a mobile body according to the eighth embodiment of this invention.

In the above first through seventh embodiments, audio devices and image reproducing devices are disposed in the center console box. Alternatively, a display means for displaying visual information may also provided.

Figure 14:
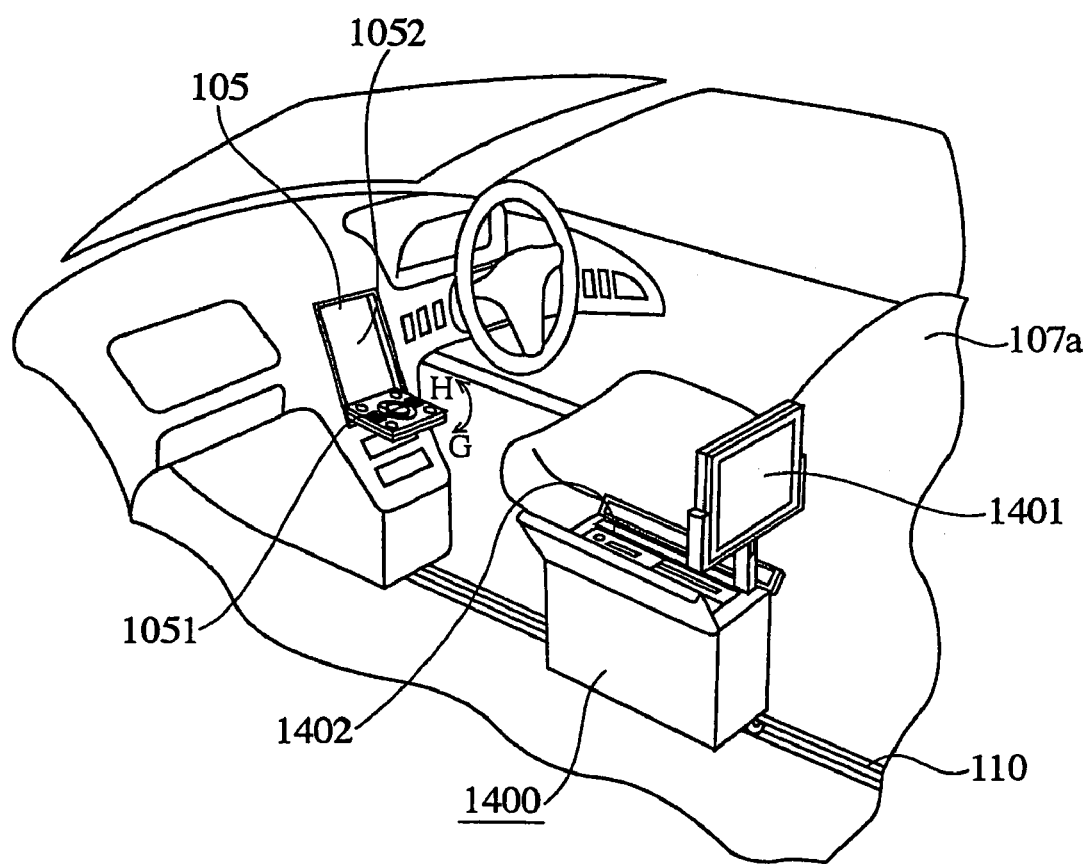
FIG. 14 is a schematic diagram showing an arrangement of a principal portion of a device installation apparatus for a mobile body according to the eighth embodiment.
Figure 15:
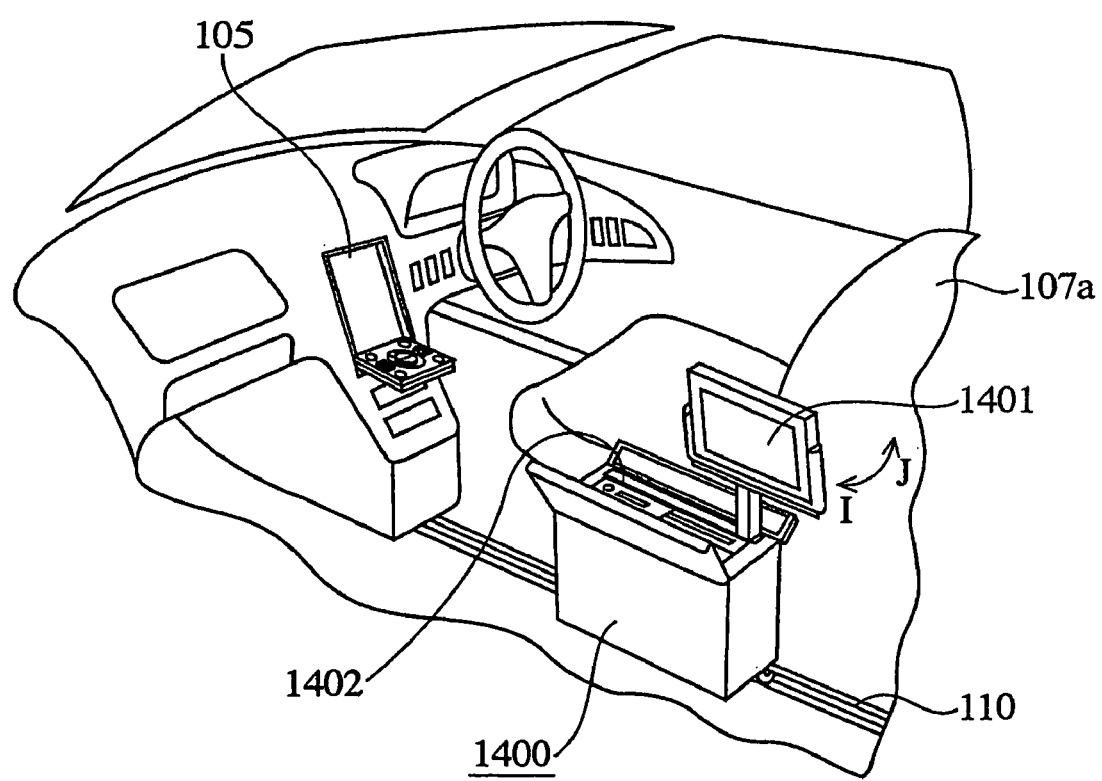
FIG. 15 is a schematic diagram of a principal portion showing a state of the displaying means moved from the state in FIG. 14.
Figure 16:
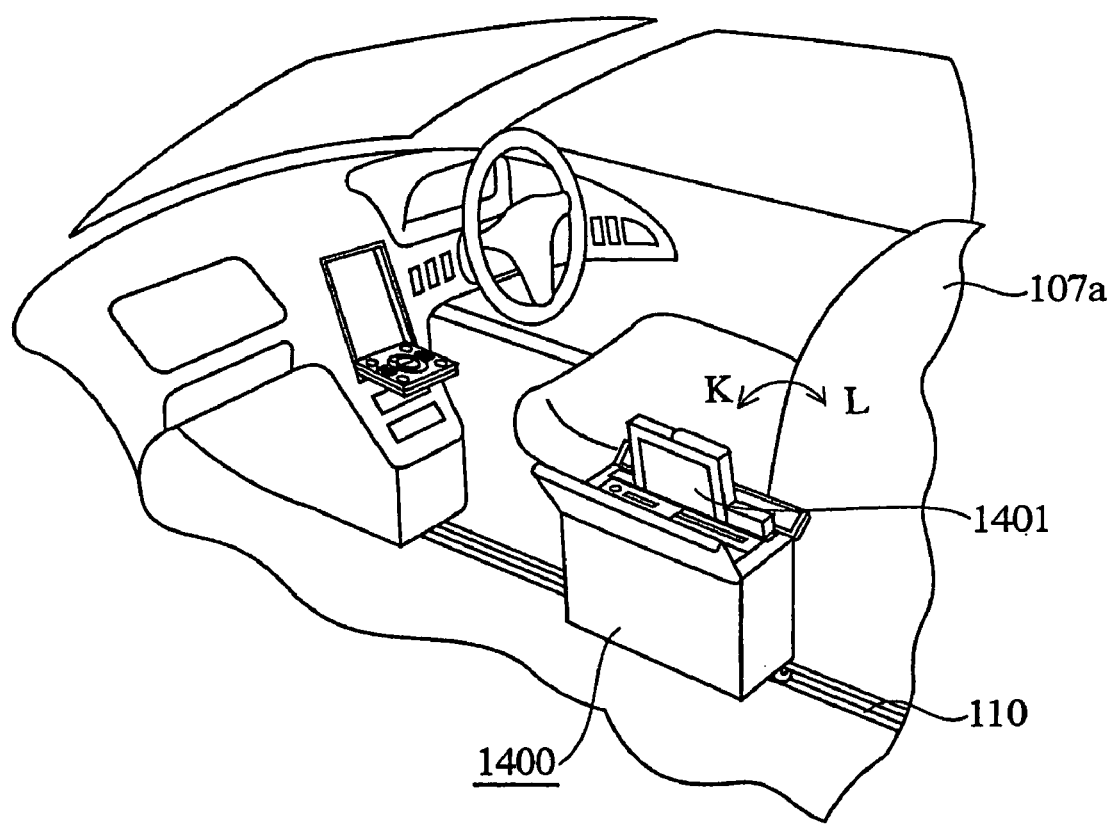
FIG. 16 is a schematic diagram of a principal portion showing a state of the displaying means moved from the state in FIG. 14

FIG. 14 is a schematic diagram showing an arrangement of a principal portion according to the eighth embodiment, and FIGS. 15 and 16 are schematic diagram of a principal portion showing the states of the displaying means moved from the state in FIG. 14.

In FIGS. 14 through 16, reference numeral 105 denotes a displaying means such as a display or the like. This displaying means 105 is constituted by an operating portion 1051 and a displaying portion 1052.

This operating portion 1051 is rotatable in the direction H or G in FIG. 14. When the operating portion is folded, it rotates in the direction H so that the operating surface of the operating portion 1051 faces the displaying portion 1052.

When the operating portion 1051 is folded in this manner, the operation thereof cannot be made.

Reference numeral 107*a* denotes a driver's seat and reference numeral 1400 denotes a center console box. In this center console box 1400 a displaying means 1401 is provided, and the display surface of this displaying means 1401 faces backward.

Reference numeral 1402 denotes a housing space formed in the center console box 1401 for housing therein the displaying means 1401. It is so arranged that the displaying means 1401 can wholly be housed inside the center console box 1400.

Now, referencing to FIGS. 15 and 16, a description of the operation will be made about housing of the displaying means 1401 into the center console box 1400.

When the displaying means 1401 is in use, it is disposed as shown in FIG. 14. When this displaying means 1401 is to be housed inside the center console box 1400, the orientation of the displaying means 1401 is changed to the direction I as shown in FIG. 15.

Then, as shown in FIG. 16, the displaying means 1401 is laid down in the direction K to house it inside the center console box 1400.

The center console box 1400 is thus provided, aside from the audio device and the image reproducing device, with the displaying means 1401 for displaying the visual information of these devices. When this displaying means 1401 is not in use, it is housed inside the center console box 1400. Conventionally, since the displaying means is provided in the center portion or the like in the instrument panel, the passengers seated in a position behind the front seats are difficult to see the visual information. This arrangement, however, has an effect that these passengers are easy to see the visual information, resulting in an improvement in the visibility of the visual information.

Ninth Embodiment

A description will be made about a device installation apparatus for a mobile body according to the ninth embodiment of this invention.

In the above first through eighth embodiments, the center console box and the rail portion are provided on the floor portion inside the automotive vehicle. Alternatively, the center console box and the rail portion may also be provided on a roof portion of the automotive vehicle.

Figure 17:
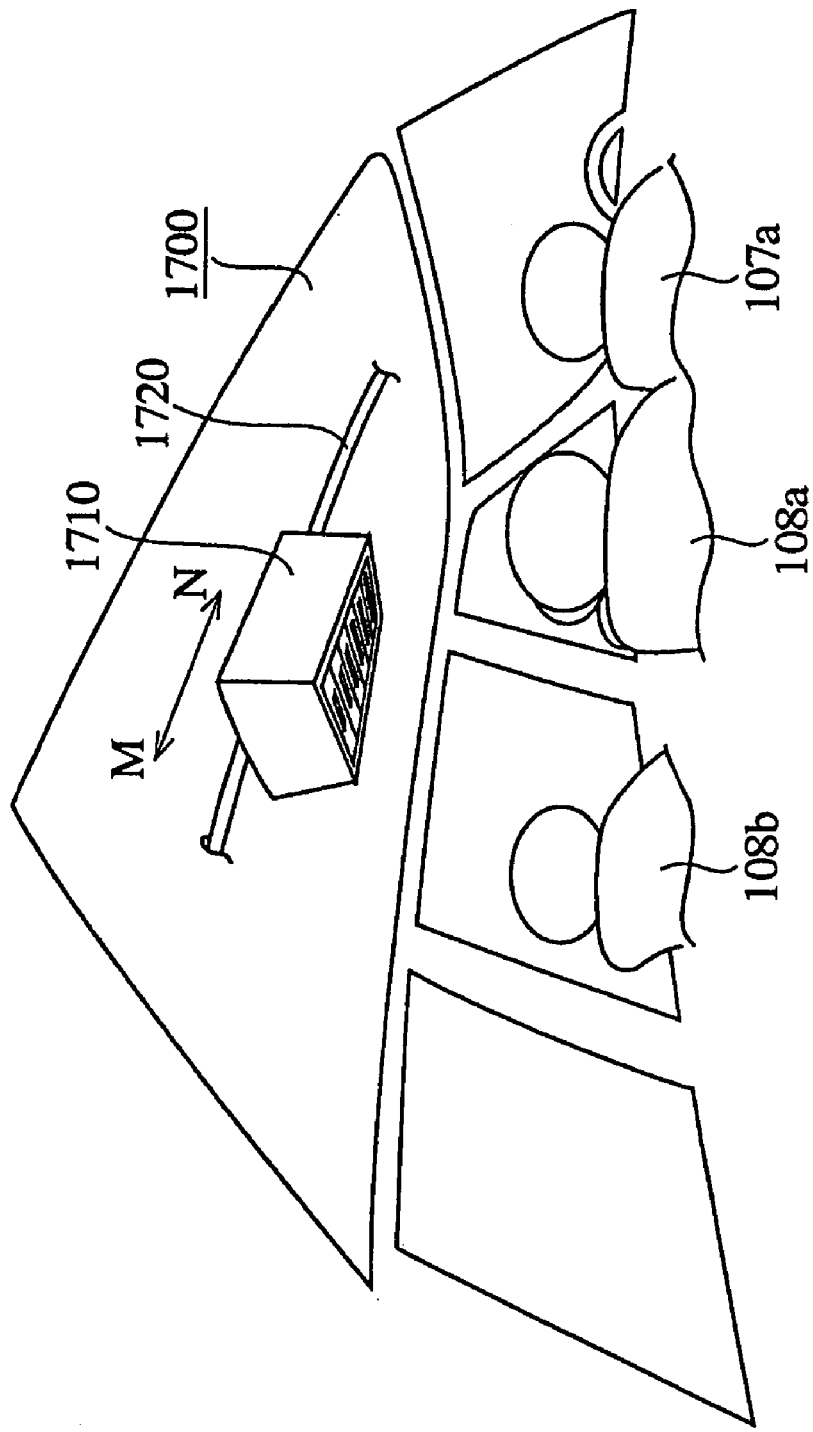
FIG. 17 is a schematic diagram showing a general arrangement of a device installation apparatus for a mobile body according to ninth embodiment.

FIG. 17 is a conceptual illustration showing a conceptual arrangement according to the ninth embodiment. Reference numeral 107*a* denotes a driver's seat, reference numeral 108*a* denotes a right-side intermediate seat positioned just behind the driver's seat, and reference numeral 108*b* denotes a left-side intermediate seat positioned just behind the assistant driver's seat.

Reference numeral 1700 denotes a roof portion inside the automotive vehicle. In this roof portion 1700, there are provided: a center console box 1710 housed therein a plurality of audio devices and image reproducing devices; and a rail portion 1720 which is internally engaged with an engaging portion (not shown) formed in part of the center console box and provided in the roof portion positioned between the seats disposed on the right side and the seats disposed on the left side, so as to extend in the longitudinal direction of the automotive vehicle.

This center console box 1710 is movable, like in the above first embodiment, in the direction M or N shown in FIG. 17.

As described above, since the center console box 1710 and the rail portion 1720 are provided in the roof portion inside the automotive vehicle, it is possible to offer a situation in which the above apparatus can be utilized in a mobile body such as a bus, an electric train, an airplane or the like in which the floor portion such as in the automotive vehicle cannot be used as a passage for the passengers. As a result, an effect is obtained that more wider applications of the apparatus can be found, and that the limited space inside the mobile body can be effectively utilized.

The above ninth embodiment has been set forth with put a limitation that the floor portion of the automotive vehicle cannot be used. Alternatively, needless to say, this apparatus may also be used in a case in which the floor portion can be used.

Further, it may also be provided the rail portion in both the floor portion and the roof portion so that, depending on the purpose of use, the center console box can be placed to either of the rail portions.

Tenth Embodiment

A description will be made about a device installation apparatus for a mobile body according to the tenth embodiment of this invention.

In the above first through ninth embodiments, when the center console box is moved, it is manually moved by the user. Alternatively, a roller portion also may be provided, which comes into contact with the engaging portion of the center console box so as to rotate by a driving force of a driving motor. When the center console box is moved, the center console box which is in contact with the roller portion is automatically moved, by rotating the roller portion, along the guide of the rail portion.

In other words, when the user operates by pushing the operating means such as a remote controller or the like, the driving motor is rotated in response to the operation command. By means of the roller portion which rotates in response to this rotation, the center console box is automatically moved.

Therefore, automatic moving of the central console box eliminates the trouble incident to manual moving of the center console box by the user, resulting in an improvement of the convenience of the apparatus.

Eleventh Embodiment

A description will be made about a device installation apparatus for a mobile body according to the eleventh embodiment of this invention.

In the above tenth embodiment, the center console box can be automatically moved by the operation of the user. Alternatively, the center console box may be automatically returned to the predetermined position, i.e., to a default position when the ignition switch is turned on.

Therefore, owing to arrangement as described above, because the predetermined position is a position which is convenient to the user, the position of the center console box which is changed by the movement of the center console box is reset when the ignition switch is turned off to automatically move it to the default position. Therefore, the user is not obliged to move the center console box whenever he or she is on the automotive vehicle, resulting in an improvement in the convenience of the user.

Twentieth Embodiment

A description will be made about a device installation apparatus for a mobile body according to the twentieth embodiment of this invention.

In the above eleventh embodiment, when the power source of the automotive vehicle is turned off, i.e., the ignition switch is turned off, the center console box is returned to the predetermined position, i.e., to a default position. Alternatively, the default position may be set to a position near the seat of the driver who is the most frequent passenger of the automotive vehicle, i.e., to a position between the driver's seat and the assistant driver's seat.

Previous setting of the position corresponding to the seat of the driver who is the most frequent passenger of the automotive vehicle as the default position improves the driver's convenience.

Thirteenth Embodiment

A description will be made about a device installation apparatus for a mobile body according to thirteenth embodiment of this invention.

The rail portion may be provided with a plurality of recessed portions at an interval, e.g., of 5 cm as engaging portions for engaging the center console box. When the center console box 109 is moved based on the guide of the rail portion 110, the center console box 109 may be engaged with any one of the plurality of recessed portions. It is thus so arranged that the center console box is engaged with the recessed portion and the movement of the center console box is once stopped there.

Therefore, positioning of the moving position of the center console box can easily be made and the operability in moving operation of the console box is improved.

Fourteenth Embodiment

A description will be made about a device installation apparatus for a mobile body according to fourteenth embodiment of this invention.

In the above thirteenth embodiment, the recessed portions formed in a part of the rail portion may be provided so as to correspond to the positions of seats disposed inside the automotive vehicle. The operability of the moving operation of the center console box can further be improved.

Fifteenth Embodiment

A description will now be made about a display apparatus to be provided in an automotive vehicle-together with a device installation apparatus for a mobile body according to the fifteenth embodiment of this invention.

In the above first embodiment, the display 105 as shown in FIGS. 28 through 31 is provided in the central portion of the instrument panel 102. Alternatively, the display 105 may be constituted as will be described below.

Figure 18:
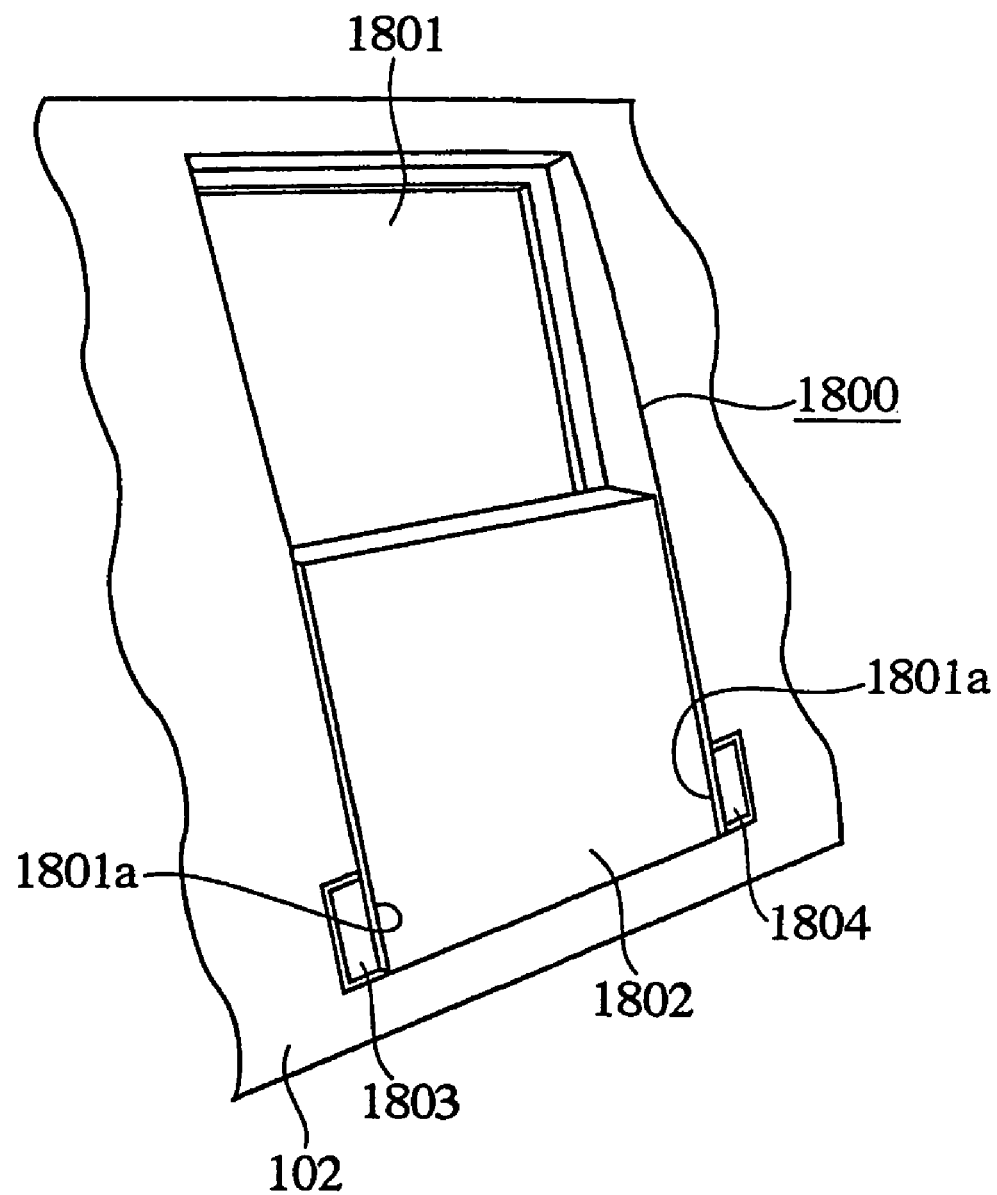
FIG. 18 is a schematic diagram showing an overall arrangement of a display apparatus according to fifteenth embodiment.
Figure 19:
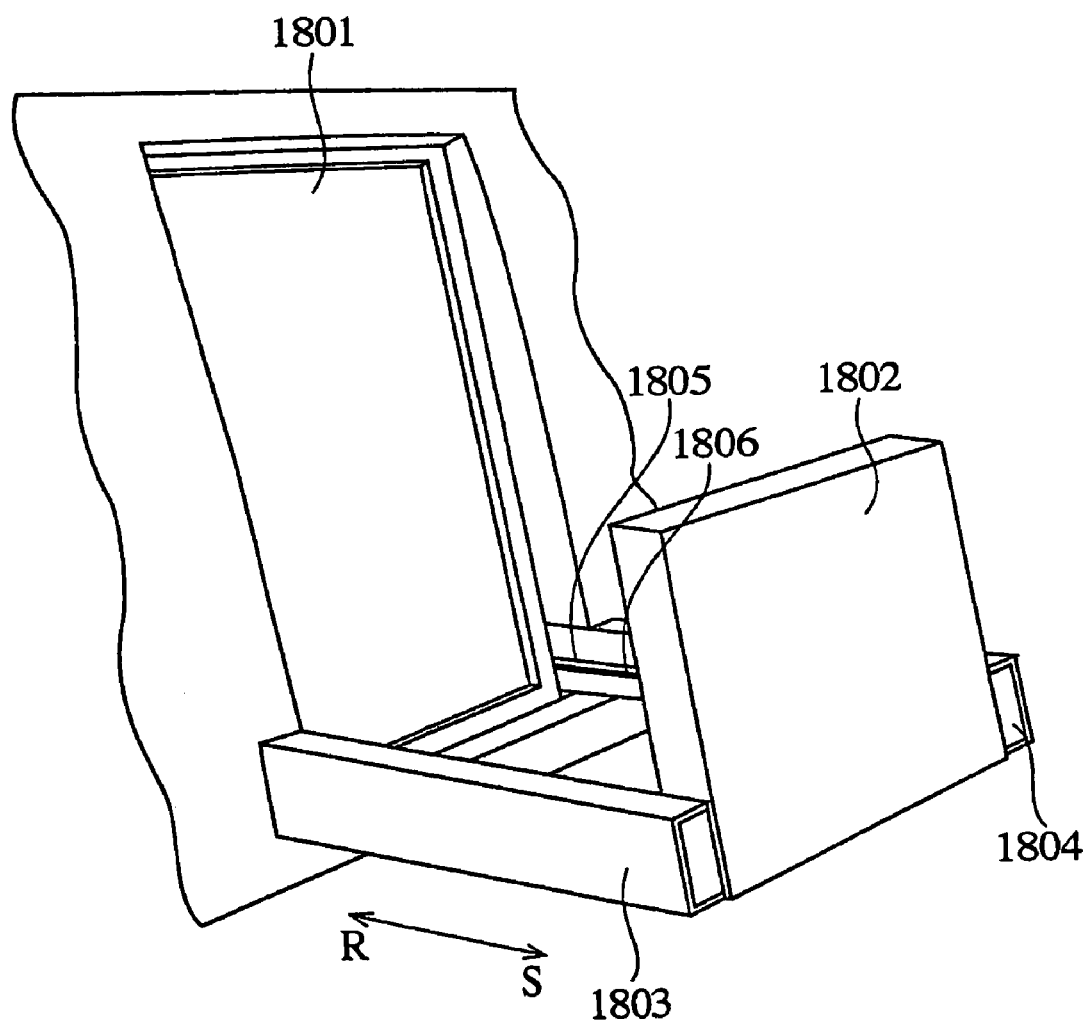
FIG. 19 is a schematic diagram showing a state of the operation moved from the state in FIG. 18.
Figure 20:
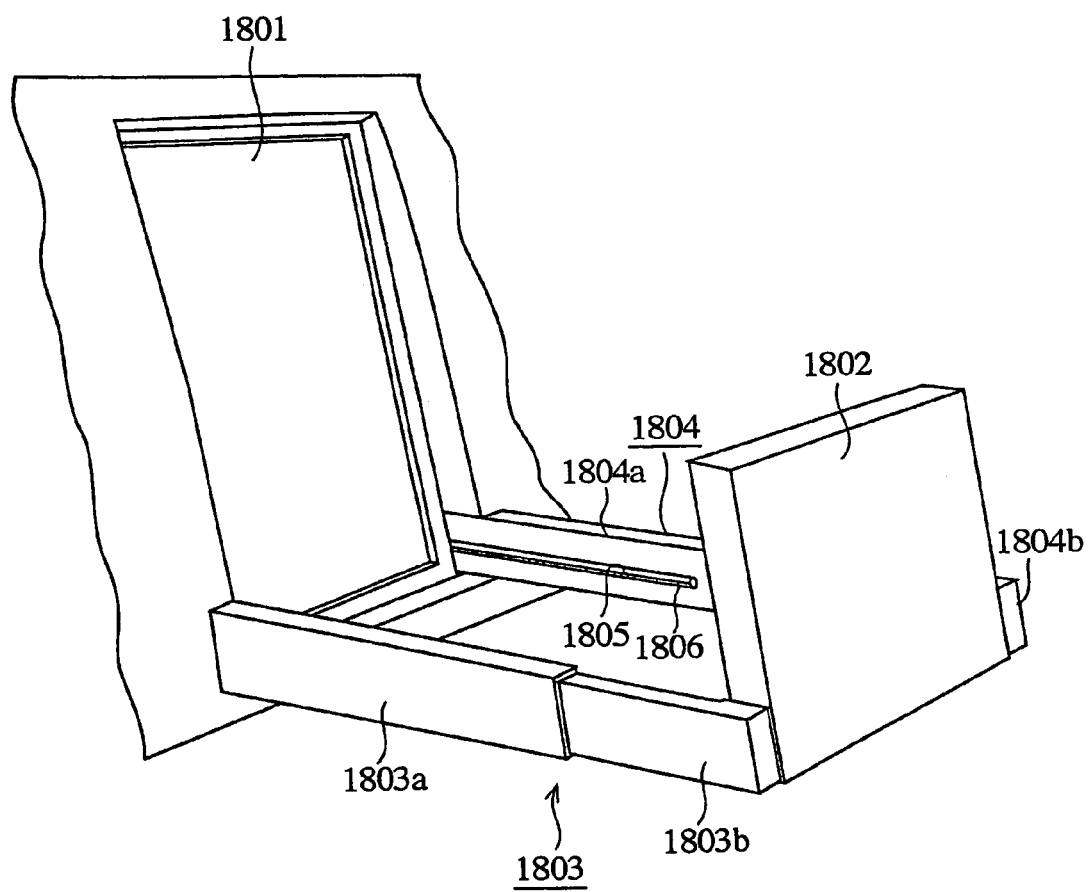
FIG. 20 is a schematic diagram showing a state of the operation moved from the state in FIG. 18.
Figure 21:
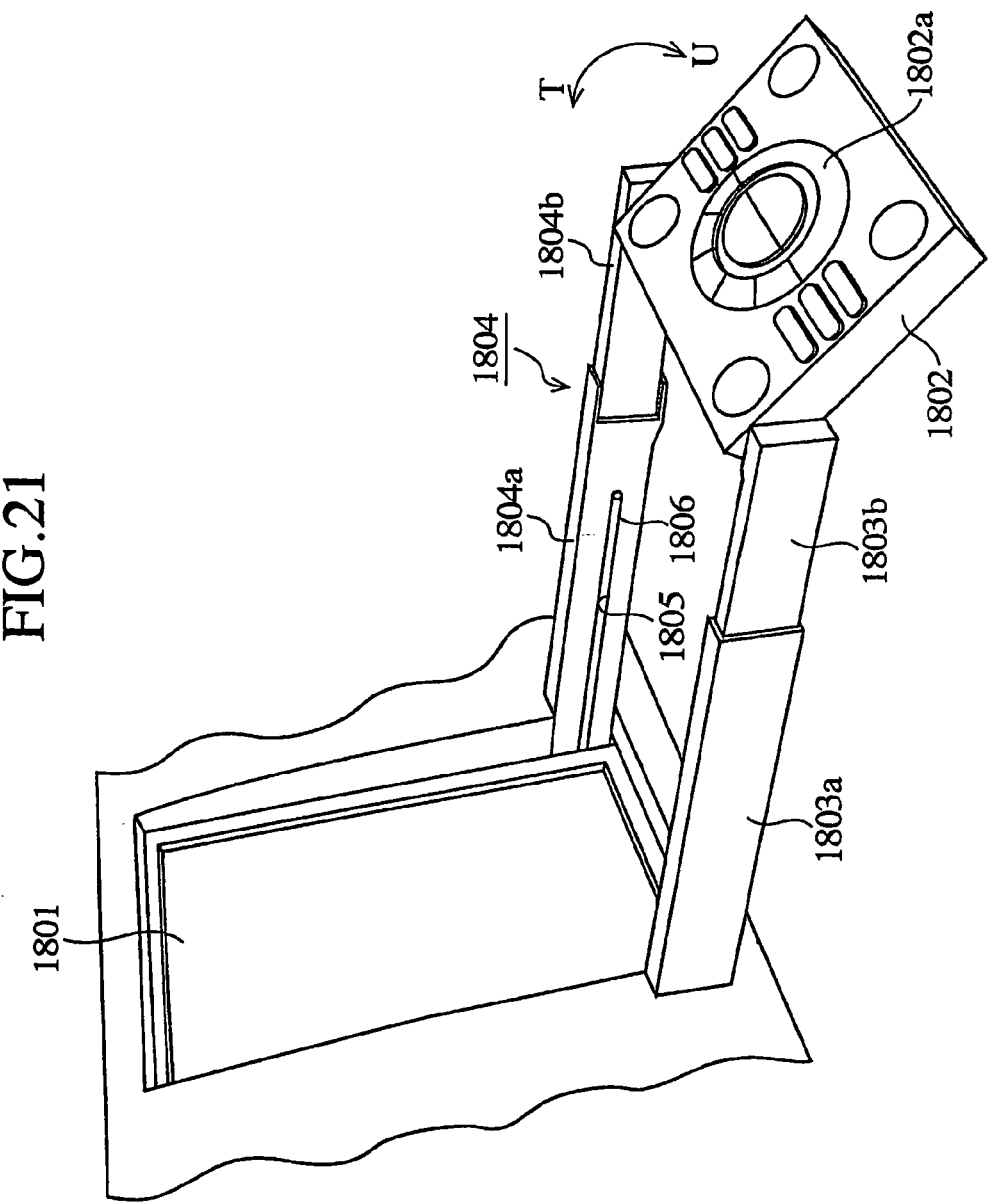
FIG. 21 is a schematic diagram showing a state of the operation moved from the state in FIG. 18.

FIG. 18 is an overall block diagram showing an overall arrangement of a display apparatus, FIGS. 19, 20 and 21 are schematic diagram showing a state of the operation moved the state from FIG. 18.

In FIG. 18, reference numeral 1800 denotes a display apparatus provided in a central portion of an instrument panel 102. This display apparatus 1800 is constituted by: a displaying portion 1801 as a displaying means for displaying visual information; a supporting portion made up of a left side supporting portion 1803 and a right side supporting portion 1804, both serving as a supporting means for supporting an operating portion 1802 (to be described later) on both ends which correspond to lower peripheral portions 1801a of this displaying portion 1801 as viewed in FIG. 18; and the operating portion 1802 as an operating means for performing an operation of this display apparatus 1800. This operating portion 1802 is rotatable on the supporting portion.

In addition, in FIGS. 19 and 20, the supporting portion constituted by the left side supporting portion 1803 and the right side supporting portion 1804 is formed by an arm portion. At the time of setting to a first position in which the operating portion 1802 is housed, the arm portion is housed and, at the time of setting to a second position, the arm portion which moves coupled with the operating portion so as to separate the displaying portion 1801 and the operating portion 1802 projects forward. The left side supporting portion 1803 is constituted by a first left arm portion 1803a and a second left arm portion 1803b which is housed inside the first left arm portion 1803a, both 1803a/1803b being defined as the arm portion. In addition, the right side supporting portion 1804 is constituted by a first right arm portion 1804a and a second right arm portion 1804b which is housed inside the first right arm portion 1804a, both 1804a/1804b being defined as the arm portion. The first left arm portion 1803a and the first right arm portion 1804a are housed inside the instrument panel. In other words, in case the operating portion 1802 is not in use, the left side supporting portion 1803 and the right side supporting portion 1804 are, as shown in FIG. 18, housed inside the instrument panel.

In a part of each of those surfaces of the first left arm portion 1803*a* and the first right arm portion 1804*a* which face each other, i.e., in a part of the left side surface of the first right arm portion 1804*a*, a slit-like groove portion 1805 is provided as shown in FIG. 21, and in a part of the right side surface of the first left arm portion 1803*a*, a groove portion 1805 is formed, which is similar to the groove portion 1805 formed in the first right arm portion 1804*a*.

Further, in a part of the left side surface of the second right arm portion 1804*b*, a projected portion 1806 is formed. This projected portion 1806 is fit into the groove portion 1805 formed in the first right arm portion 1804*a*. It is thus so arranged that the projected portion 1806 slidably moves inside the groove portion 1805 coupled with the movement of the second right arm portion 1804*b*. In addition, in a part of the right side surface of the second left arm portion 1803*b*, a projected portion 1806 is formed, which is similar to the projected portion 1806 formed in the second right arm portion 1804*b*. This projected portion 1806 is fit into the groove portion 1805 formed in the first left arm portion 1803*a*. It is thus so arranged that the projected portion 1806 slidably moves along the groove portion 1805 coupled with the movement of the second left arm portion 1803*b*.

Next, with reference to FIGS. 22 through 24, the mechanism for performing the operation for projecting the operating portion 1802 toward this side from the displaying portion 1801 will now be described.

Figure 22:
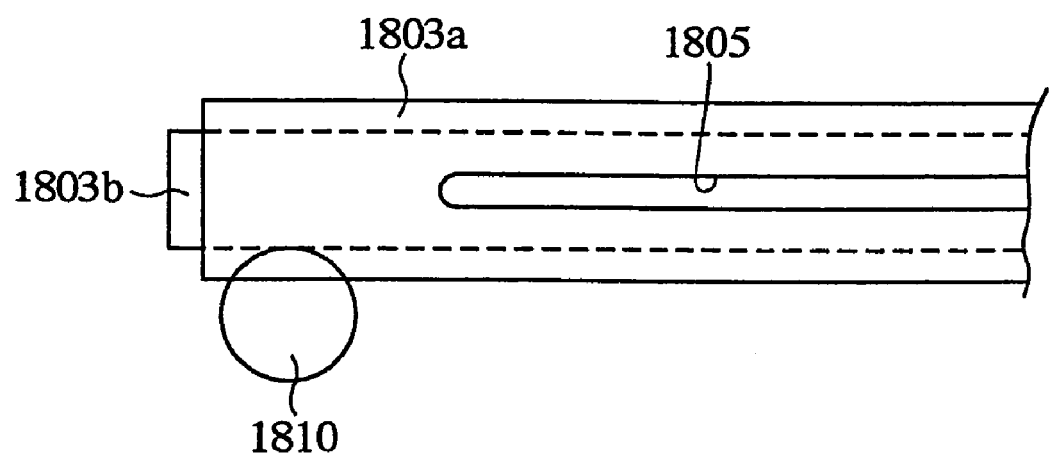
FIG. 22 is a sectional view showing a section of a principal portion of the display apparatus according to the fifteenth embodiment.
Figure 23:
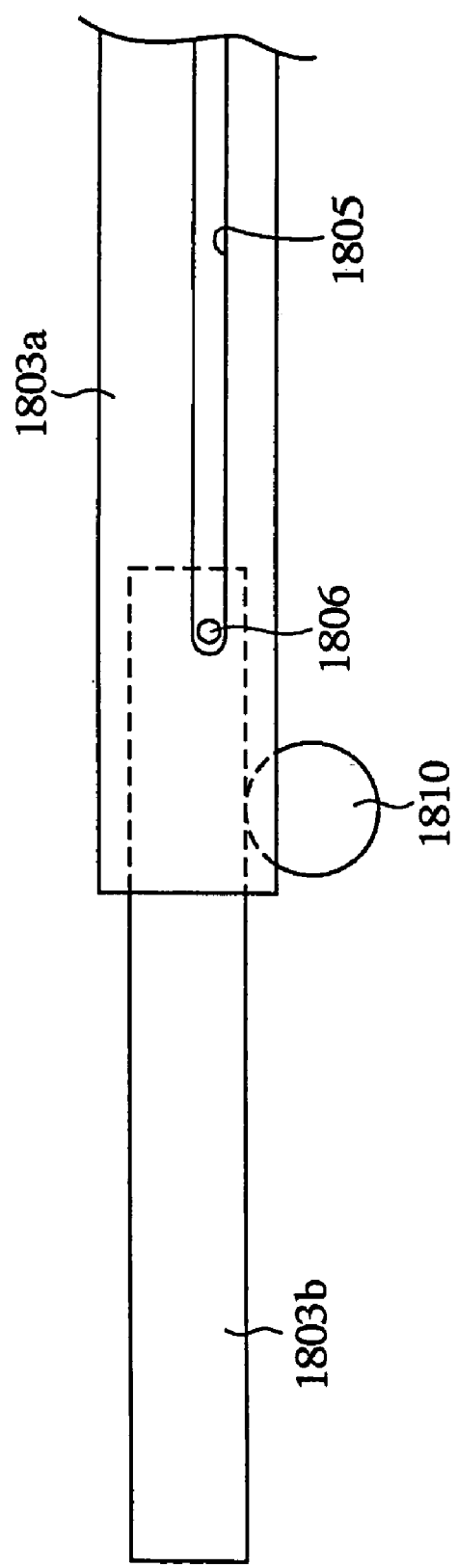
FIG. 23 is a schematic diagram showing a state of the operation a principal portion.

FIG. 22 is a sectional view showing a section in the longitudinal direction of the left side supporting portion 1803. FIGS. 23 and 24 show the state in which the first left arm portion 1803*a* and the second left arm portion 1803*b* project in the left direction as viewed in the figures, i.e., extend in the left direction, from the state shown in FIG. 22 to the state shown in FIG. 20.

In FIG. 22, reference numeral 1810 denotes a roller portion provided inside the display apparatus. A contact surface of this roller portion 1810 comes into contact with the lower surfaces of the first left arm portion 1803*a* and the second arm portion 1803*b*.

Having been arranged as described above, once a user gives a pulling force to the operating portion 1802 so as to pull it out, the roller portion 1810 rotates in the counter-clockwise direction. As a result, first, the second left arm portion 1803*b* extends in the direction S as shown in FIG. 19, i.e., in the extending direction toward this side. At this time, although the state is as shown in FIG. 23, from the viewpoint of the relationship between the groove portion 1805 and the projected portion 1806, the projected portion 1806 formed on the right side of the second left arm portion 1803*b* slides, coupled with the movement of the second left arm portion 1803*b*, inside the groove portion 1805 formed in the right side surface of the first left side arm portion 1803*a*. The projected portion 1806 moves to the left end portion of the groove portion 1805, with the result that the projected portion 1806 is in contact with the left end portion of the groove portion 1805.

Figure 24:
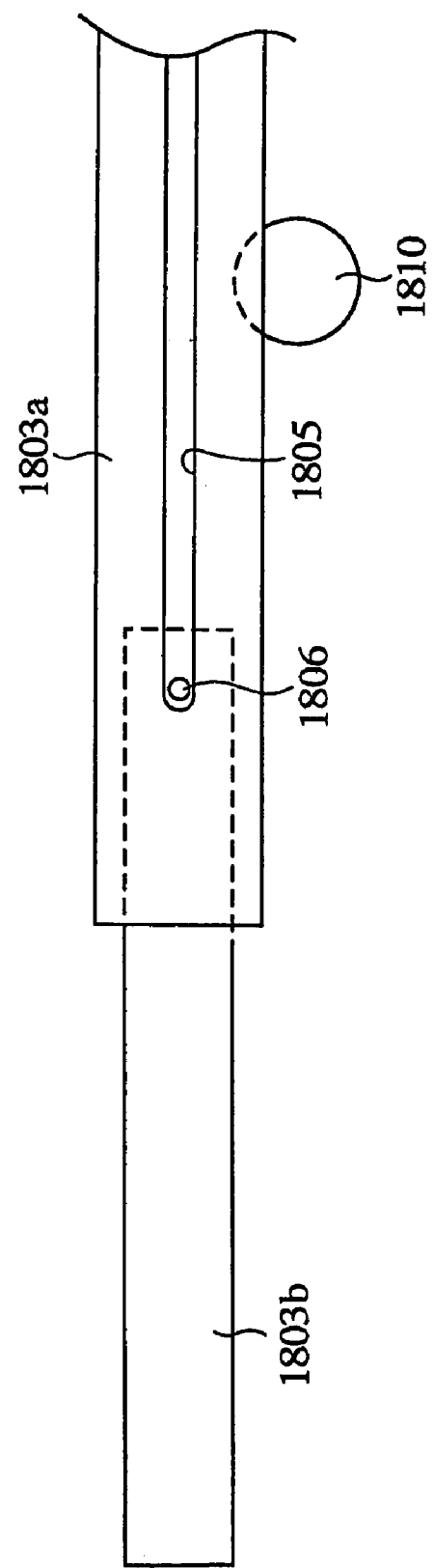
FIG. 24 is a schematic diagram showing a state of the operation of a principal portion.

Further, with the help of the pulling out force of the operating portion 1802, the first left arm portion 1803*a* is moved, with the projected portion 1806 serving as a supporting point, from a state of contact with the left end portion of the groove portion 1805 in the direction S as shown in FIG. 19 to a state as shown in FIG. 24. The display apparatus as a whole will get into the state as shown in FIG. 20.

Next, a description will be made about a mechanism which performs the rotating operation of the operating portion 1802 to enable an operating surface 1802*a* to face toward the operator so as to operate the operating portion 1802.

Figure 25:
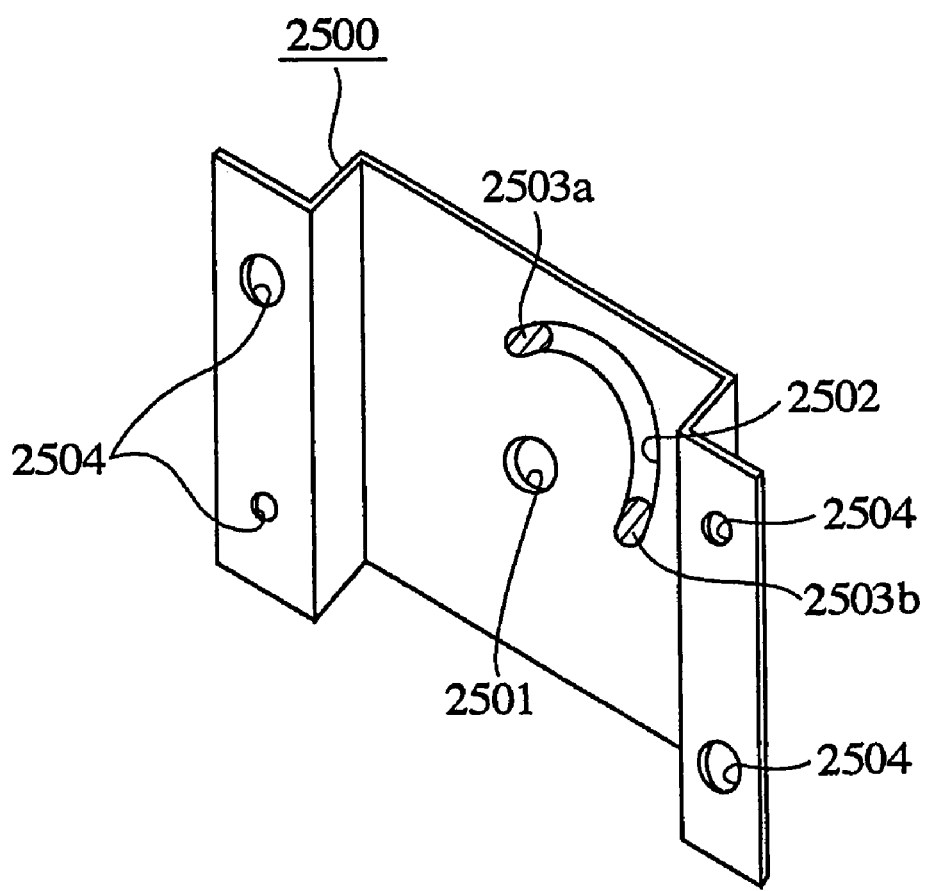
FIG. 25 is a schematic diagram showing a principal portion of a rotary mechanism.
Figure 26:
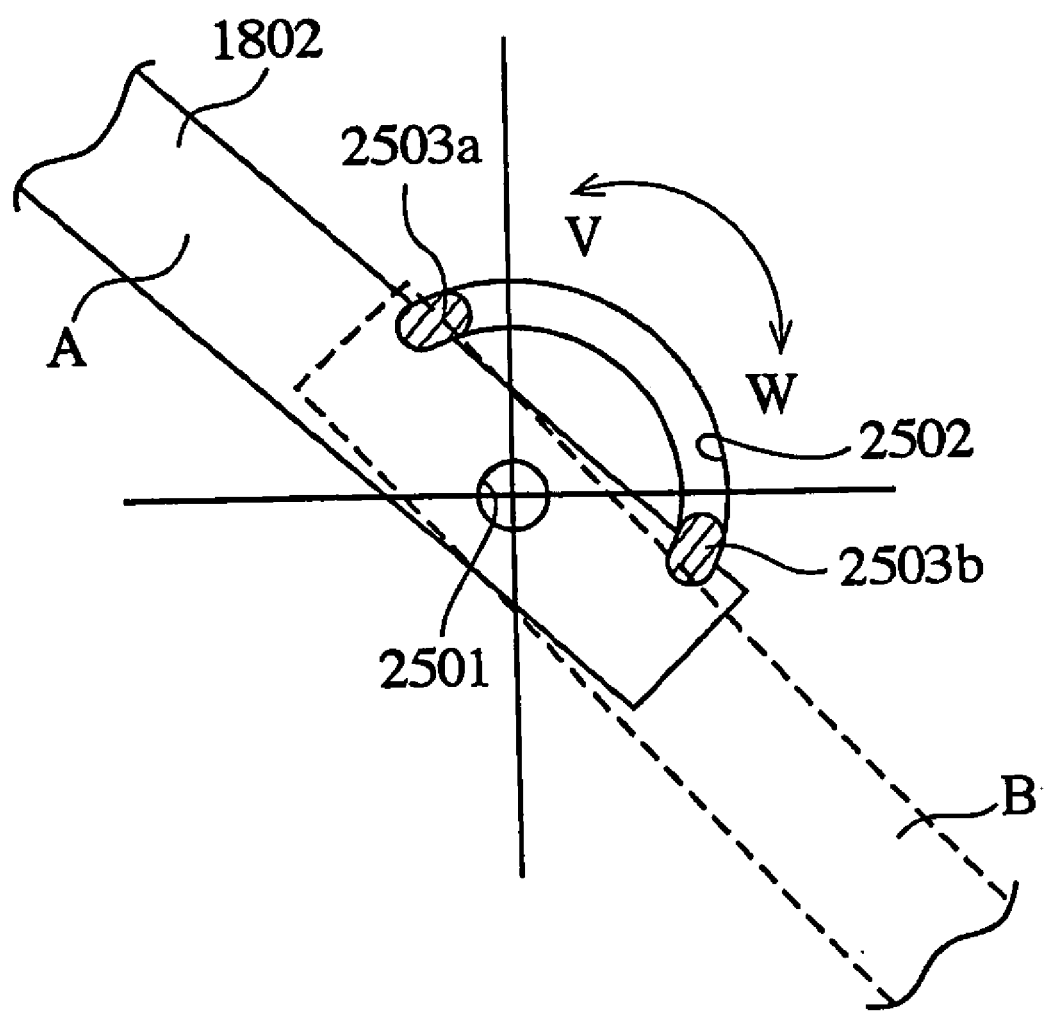
FIG. 26 is a schematic diagram showing a state of the operation of the rotary mechanism.
Figure 27:
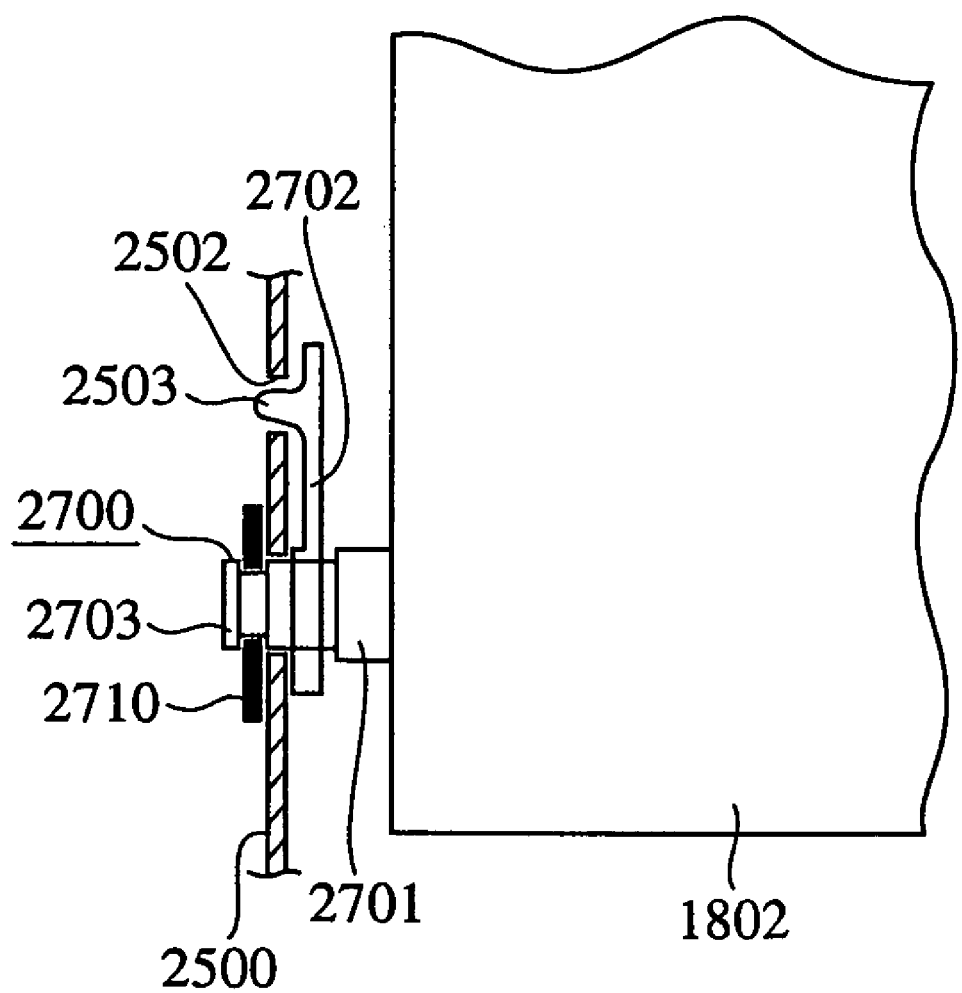
FIG. 27 is a schematic diagram showing an arrangement of a principal portion of the rotary mechanism.

FIG. 25 is a schematic diagram showing a principal portion of a rotary mechanism, FIG. 26 is a schematic diagram showing a state of the operation of the rotary mechanism, and FIG. 27 is a schematic diagram showing an arrangement of a principal portion of the rotary mechanism.

In FIG. 25, reference numeral 2500 denotes a rotation restricting plate portion for restricting the rotary motion of the operating portion 1802. This rotation restricting plate portion 2500 is constituted by: a fitting hole 2501 which supports, with fitting thereinto, a front end portion of a shaft portion 2701 which is integrally formed in a part of each end surface of the operating portion 1802 as shown in FIG. 27; a groove portion 2502 which is formed into an arcuate shape; and screw holes 2504 for mounting by screws or the like on a front end of this side of the right side surface of the second left arm portion 1803*b* and on a front end of this side of the left side surface of the second right arm portion 1804*b*.

In addition, in FIG. 27, reference numeral 2700 denotes an element constituting a rotary shaft of the operating portion 1802 which is formed integrally with a part of each end surface of the operating portion 1802. This rotary shaft 2700 has also integrally formed with a plate portion 2702, which is formed into a disk shape and has formed a projected portion 2503 in part thereof. The projected portion 2503 is fit into the fitting hole 2501 in the rotation restricting plate portion 2500, and a member 2710 to prevent the rotation restricting plate portion 2500 from being pulled out is mounted on the rotary shaft 2700 near a front end portion 2703 thereof.

Here, FIG. 25 shows a state in which the projected portion 2503 is fit into the groove portion 2502. Reference numeral 2503*a* denotes a position of the projected portion 2503 in which, as shown in FIGS. 18, 19 and 20, the operating portion 1802 is folded, i.e., is closed. Reference numeral 2503*b*, on the other hand, shows a position of the projected portion 2503 in which, as shown in FIG. 21, the operating portion 1802 is opened. In this manner, the rotary movement is restricted by the contact of the projected portion 2503 with the end portions of the groove portion 2502.

Further, as to these operations, as shown in FIG. 26, "A" denotes a state in which the operating portion 1802 is closed. The projected portion 2503 in this state is in the position of 2503*a*. "B" shown in dotted lines denotes a position in which the operating portion 1802 is opened. The projected portion 2503 in this state is in the position of 2503*b*.

Then, a description will be made about the rotary motion of the operating portion 1802.

First, at the time of non-operation, i.e., in a state in which no operation is made, the operating surface 1802*a* of the operating portion 1802 is set, as shown in FIG. 18, in a first position facing the display surface of the displaying portion 1801. On the other hand, at the time of operation, i.e., when an operation is made, after the operating portion 1802 is pulled out of the first position shown in FIG. 18, the operating portion 1802 is rotated in the direction U as shown in FIG. 21, thereby setting the operating portion 1802 to a second position in which the operation of the operating surface 1802*a* of the operating portion 1802 is possible.

Here, a description will be made about a series of movements to change from the state in which the operating portion 1802 is wholly housed in the display apparatus as shown in FIG. 18, to the state in which the operating portion 1802 is completely separated from the display apparatus as shown in FIG. 21, thereby enabling an operation of the operating surface 1802a.

In the state shown in FIG. 18, the user pulls out the operating portion 1802 and, after having pulled out the operating portion 1802 to the predetermined position through the positions shown FIGS. 19 and 20, the operating portion 1802 is rotated in the direction U as shown in FIG. 21, thereby appearing the operating surface 1802a in the vehicle compartment.

On the contrary, when the operating portion 1802 is housed face to face with the displaying portion from the state shown in FIG. 21, the operations are made in the reverse direction of those as described above.

Therefore, as described above, since the apparatus is constituted, together with the displaying portion and the operating portion, by the supporting means which supports the operating portion and is retractable, and the rotary mechanism which rotates the operating portion. This enables operation of the operating portion in a position favorite to the user. In other words, the operation can be made in a comfortable posture while the user remains seated, resulting in an improvement in the convenience.

Figure 32:
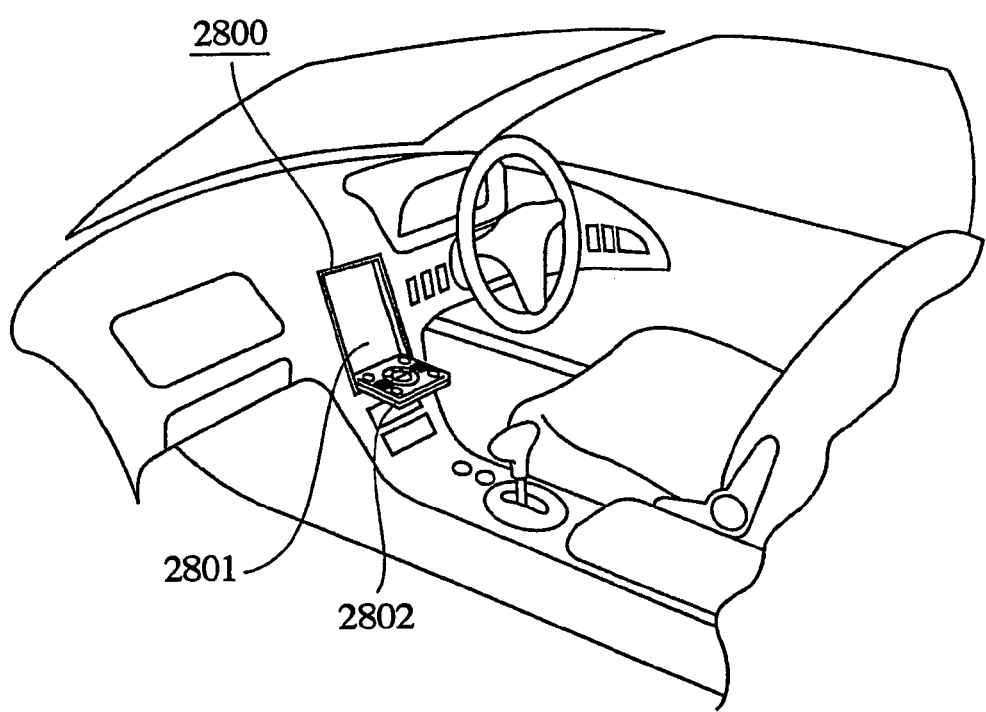
FIG. 32 is a schematic diagram showing an operation of a principal portion of the display apparatus according to the fifteenth embodiment.
Figure 33:
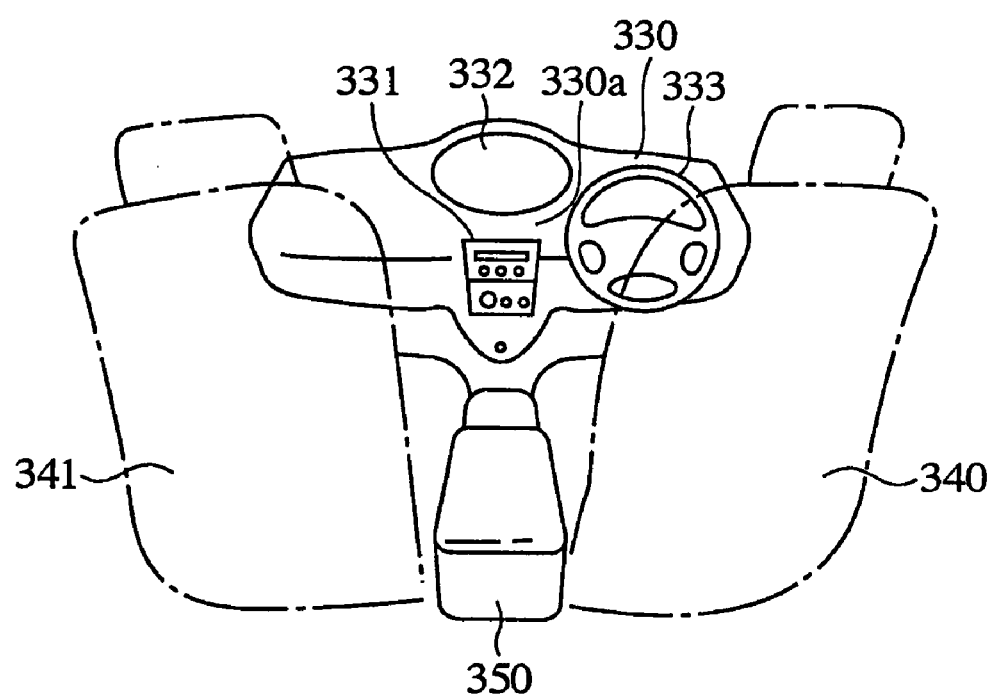
FIG. 33 is a detailed view showing a principal portion of an inside of a conventional mobile body.
Figure 34:
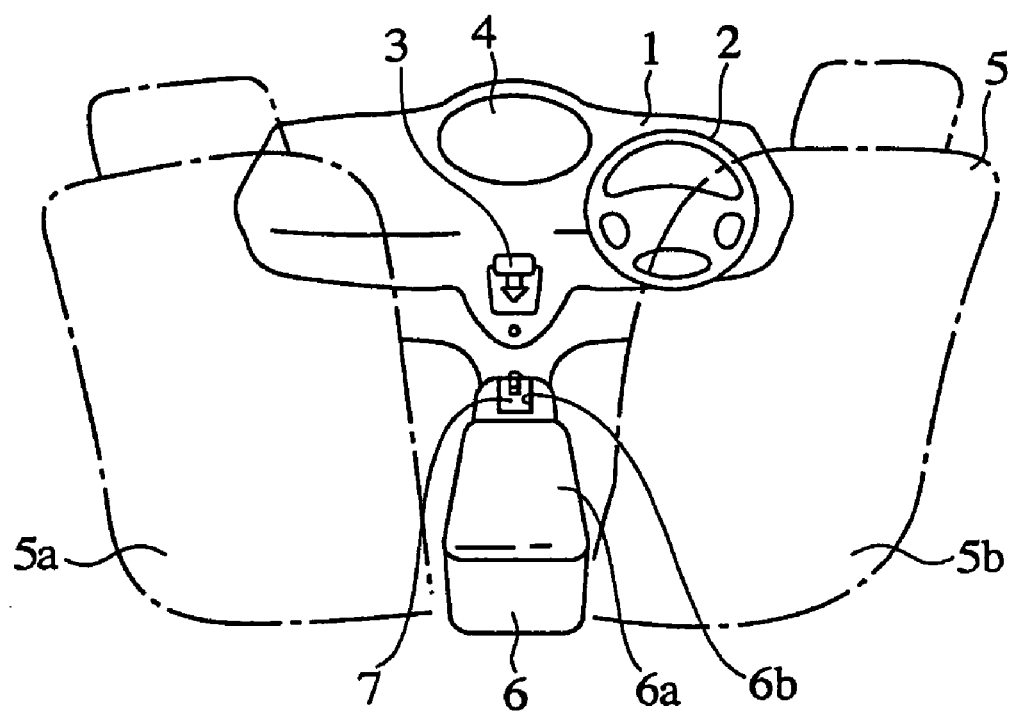
FIG. 34 is a detailed view of a principal portion of an inside of a conventional mobile body.
Figure 35:
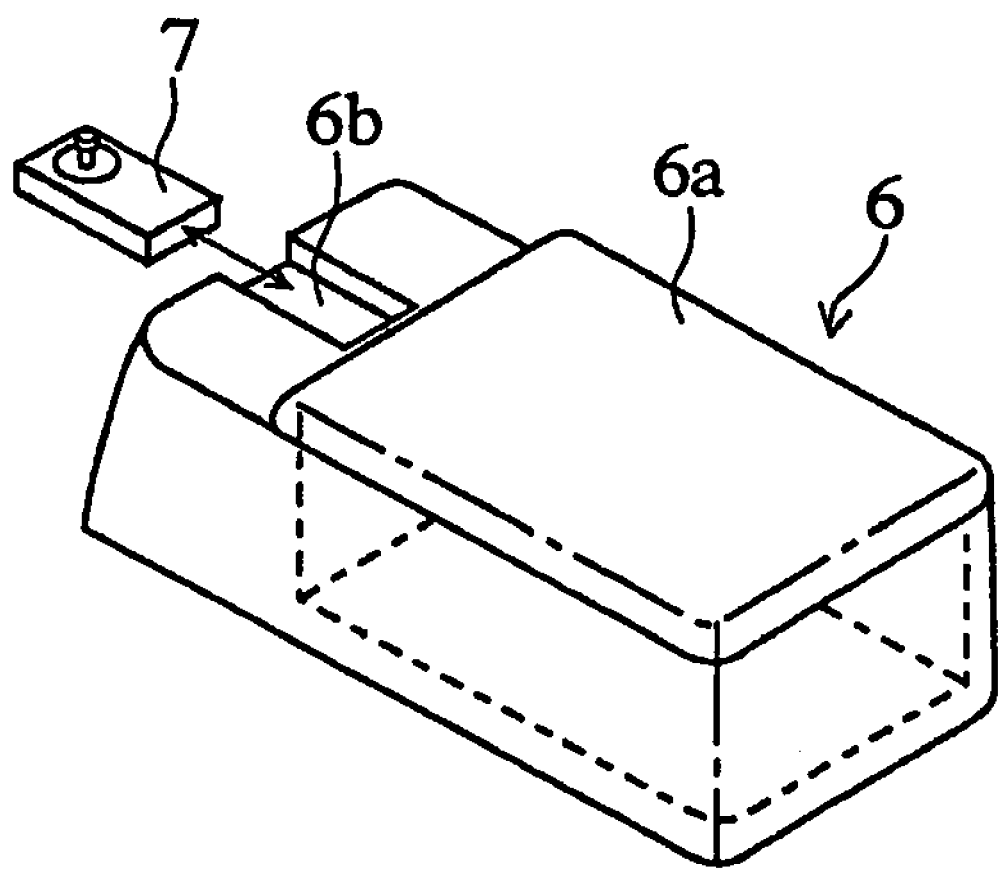
FIG. 35 is a schematic diagram showing an arrangement of a center console box provided inside a conventional mobile body.
Figure 36:
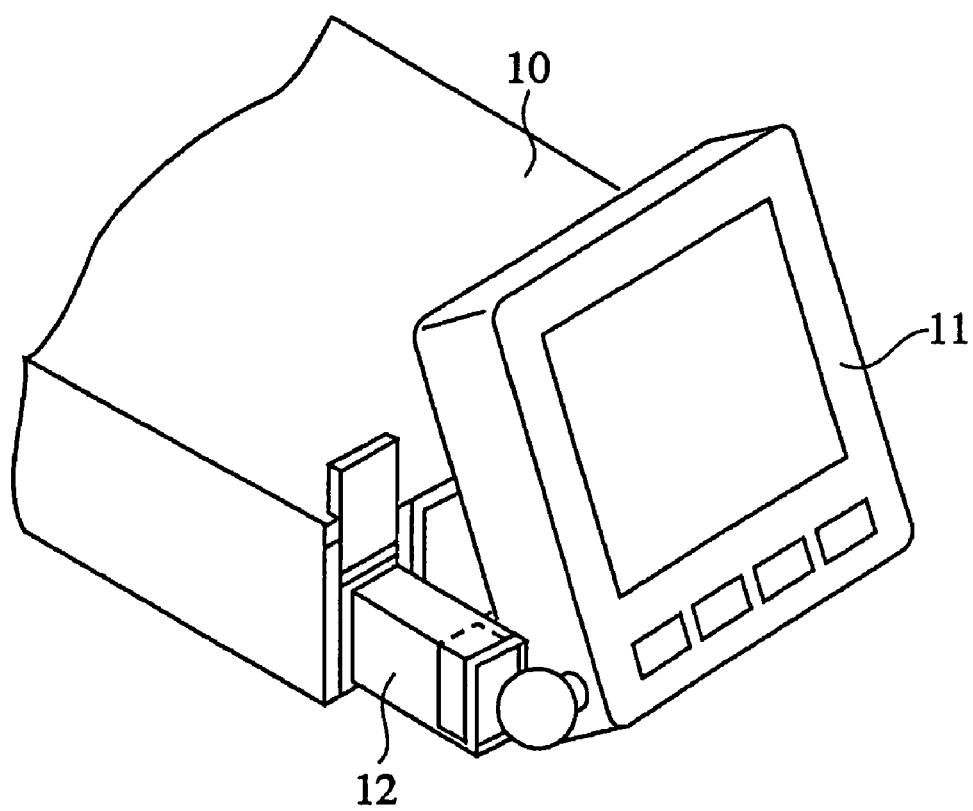
FIG. 36 is a schematic diagram showing an arrangement of a principal portion of a display apparatus provided inside a conventional mobile body.
Figure 37:
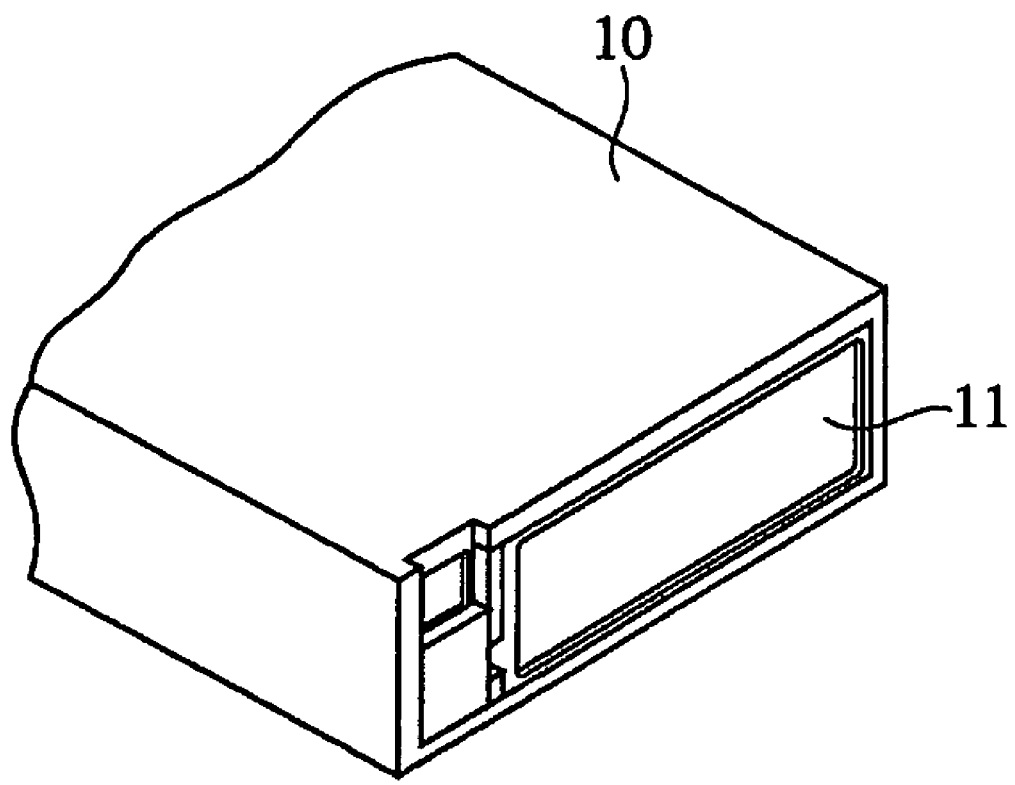
FIG. 37 is a schematic diagram showing a state of operation of the display apparatus provided inside the conventional mobile body.
Figure 38:
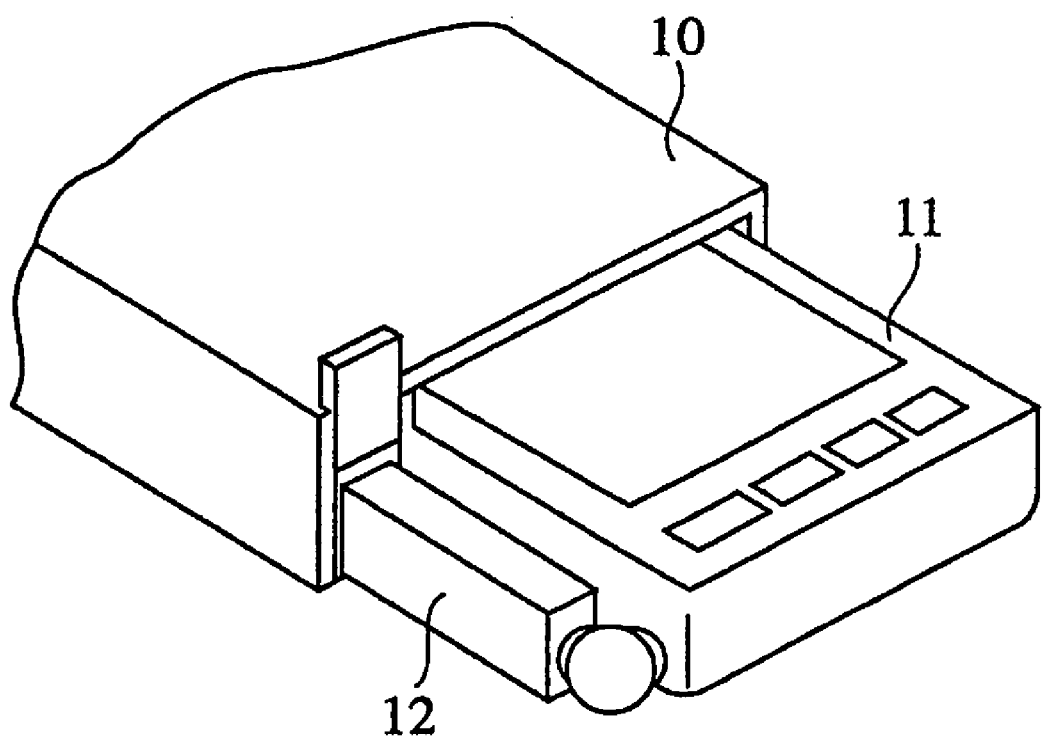
FIG. 38 is a schematic diagram showing a state of operation of the display apparatus provided inside the conventional mobile body.

FIG. 32 shows a state in which only the operating portion 2802 rotates to get into an operable state without pulling out the supporting portion. In this manner, depending on how the user uses, it may be performed only the rotary operation of the operating portion 2802 without projecting the supporting portion.

Sixteenth Embodiment

A description will be made about a display apparatus provided in an automotive vehicle together with a device installation apparatus for a mobile body according to sixteenth embodiment of this invention.

In the above fifteenth embodiment, it lacks a description that displaying on the display surface in a state in which, as shown in FIG. 18, the operating surface 1803a of the operating portion 1802 faces with the display surface of the displaying portion 1801, i.e., the operating surface 1802a of the operating portion 1802 is folded onto the displaying portion 1801 so that the display surface and the operating surface are overlapped with each other as shown in FIG. 18. In this sixteenth embodiment, the display is possible on a surface onto which the operating surface 1802a is not overlapped. Therefore, when the operating portion 1802 is set to the first position which is the housed position, it may be made a display only on the display surface not overlapped with the operating surface 1802. In other words, visual information such as map information or the like which is outputted by a navigation apparatus (not shown) or visual information which is outputted by an audio device, an image reproducing device or the like mounted inside the automotive vehicle is displayed only on the display surface which is not overlapped with the operating portion 1802.

Having been constituted as described above, the displaceable portion can be effectively utilized and the convenience of the user is improved.

Seventeenth Embodiment

A description will be made about a display apparatus provided in an automotive vehicle together with a device installation apparatus for a mobile body according to the seventeenth embodiment of this invention.

In the sixteenth embodiment as described above, the display surface of the displaying portion 1801 which is not overlapped with the operating portion 1802 is displaceable. Alternatively, it may be changed the display scale based on the size of the displaceable display surface of the displaying portion 1801.

Namely, the area of the display surface has a ratio of approximately 1:2 between a state in which the operating portion 1802 is housed and that in which it is not. Therefore, there has been a problem that despite an attempt to display the same displayed contents on the displaying portion 1801 under any circumstances, the visual information, if based on the same displaying scale, will be 1/2 in case the operating portion 1802 is housed as compared with the case in which it is not. To solve this kind of problem, the displaying scale is changed depending on the area of the display surface in order to display the same contents of visual information. For example, in case the size of the display surface of the displaying portion 1801 is 1:2, the scale ratio of the contents is changed to 1/2:1. By this arrangement, when the area of the display surface of the displaying portion 1801 is small, although the image is slightly difficult to see as compared with the case where the area of the display surface is large, an effect can be obtained that it is possible to see the same contents.

Accordingly, having been arranged as described above, when a user wishes to see the contents displayed on the displaying portion 1801 in detail where the operating portion 1802 is housed, the operating portion 1802 gets ready for operation. When a user does not wish to see the contents in detail, the operating portion 1802 may be housed, so that the displayed contents are changed into the small-scale. In this manner, the convenience of the apparatus can be further improved without missing the contents.

Eighteenth Embodiment

A description will be made about a display apparatus to be provided in an automotive vehicle together with a device installation apparatus for a mobile body according to the eighteenth embodiment of this invention.

The displaying portion 1801 shown in FIG. 18 enables a divided display in which a plurality of screens are displayed. In case the divided display is made when the displaying portion 1802 is set to the first position which is the housed position as shown in FIG. 18, the divided display may be made only on the display surface which is not overlapped with the operating surface 1802. In case the divided display is made when the operating portion 1802 is set to the second position in which the operation of the operating portion 1802 is possible, the divided display may be made on the entire display surface of the displaying portion 1801. By arranging in this manner, based on the position of the operating portion 1802, the display surface of the displaying portion 1801 can be effectively utilized, with the result that the convenience of the apparatus is improved.

Nineteenth Embodiment

A description will be made about a display apparatus provided in an automotive vehicle together with a device installation apparatus for a mobile body according to the nineteenth embodiment of this invention.

As shown in FIG. 21, when the operating portion 1802 is in the second position in which the operation thereof is possible, the operating surface 1802a of the operating portion 1802 may be positioned, which forms an obtuse angle relative to the display surface of the displaying portion 1801. Having been arranged as described above, since the operating surface of the operating portion 1802 is set to the position in which the operating surface easily comes within the field of view of the user, the visibility of the operating surface and the operability are improved.

Twentieth Embodiment

A description will be made about a display apparatus provided in an automotive vehicle together with a device installation apparatus for a mobile body according to the twentieth embodiment of this invention.

In the above nineteenth embodiment, in the second position of the operating portion 1802 in which the operation thereof is possible, the operating surface 1802a of the operating portion 1802 forms an obtuse angle relative to the display surface of the displaying portion 1801. It may be provided an angle adjusting means (not shown) for adjusting the angle formed between the operating surface of the operating portion 1802 and the display surface of the displaying portion 1801 in order to adjust an inclination of the operating portion 1802 to optimum position to the user.

Having been arranged as described above, setting of the operating portion 1802 according to his or her own body further improves the visibility and the operability.

Twenty-First Embodiment

A description will be made about a display apparatus to be provided in an automotive vehicle together with a device installation apparatus for a mobile body according to twenty-first embodiment of this invention.

In the above fifteenth embodiment, the operating portion 1802 is pulled out by the user himself. Alternatively, a driving motor may be provided inside the display apparatus to constitute a driving mechanism for transmitting the driving force of this driving motor to the roller portion 1810 shown in FIG. 22. Further, a switch may be provided in a part of the display apparatus so that the driving motor can be driven by the operation of this switch.

Having been arranged as described above, the operating portion 1802 can be automatically pulled out or housed only by the operation of the switch. This eliminates this kind of troublesome operations, resulting in a further improvement in the convenience of the user.

INDUSTRIAL APPLICABILITY

As described above, the device installation apparatus for a mobile body according to this invention is suitable for use in a mobile body such as an automotive vehicle by installing an audio device and an image reproducing device movable in the longitudinal direction of the automotive vehicle.

What is claimed is:

1. A device installation apparatus for a mobile body comprising:
an installing means, which is provided in a position sandwiched between a driver's seat and an assistant driver's seat, and is able to dispose therein a desired device; and
a guide means for movably guiding said installing means along the longitudinal direction of the mobile body;
wherein said installing means comprises a mounting/dismounting means for holding an installed device in a detachable manner and the device is replaceable by another one.

2. The device installation apparatus as claimed in claim 1, wherein said guide means comprises a plurality of engaging portions for engaging said installing means at a plurality of the predetermined different positions, and wherein, when said installing means is moved based on guiding by said guide means, said installing means being engaged with any one of said plurality of engaging portions.

3. The device installation apparatus as claimed in claim 2, wherein said engaging portions are provided in said guide means such that the engaging portions correspond to positions of seats disposed in the mobile body.

4. The device installation apparatus as claimed in claim 1, wherein said installing means comprises a plurality of mounting/dismounting means, enabling a plurality of devices to be replaced independently by other devices.

5. The device installation apparatus as claimed in claim 1, wherein said installing means has a space therein for housing a device, and wherein said mounting/dismounting means is provided in an internal portion thereof.

6. A device installation apparatus for a mobile body comprising:
an installing means, which is provided in a position sandwiched between a driver's seat and an assistant driver's seat, and is able to dispose therein a desired device including associated operating means for said device;
a guide means for movably guiding said installing means along the longitudinal direction of the mobile body; and
a user judging means for judging whether a user of said apparatus is an appropriate user or not, only when said user judging means has judged the user to be the appropriate user, the operation of the device installed inside said installing means being permitted;
wherein said installing means and said guide means are disposed on a floor portion of the mobile body.

7. The device installation apparatus as claimed in claim 1, further comprising a user judging means for judging whether a user of said apparatus is an appropriate user or not, only when said user judging means has judged the user to be the appropriate user, dismounting of a device mounted on said mounting/dismounting means being permitted.

8. The device installation apparatus as claimed in claim 7, wherein said user judging means makes at least one of a judgment as to whether the user is an appropriate user by verifying a fingerprint of the user, or by a voice of the user.

9. The device installation apparatus as claimed in claim 1 wherein said installing means comprises a displaying means for displaying visual information to be outputted by said image reproducing device.

10. A device installation apparatus for a mobile body comprising:
an installing means, which is provided in a position sandwiched between a driver's seat and an assistant driver's seat, and is able to dispose therein a desired device;
a guide means for movably guiding said installing means along the longitudinal direction of the mobile body; and
a control means for moving said installing means, when a power source is turned off after said installing means is moved, so as to return said installing means to the predetermined position.

11. The device installation apparatus as claimed in claim 10, wherein said predetermined position is a position sandwiched between the driver's seat and the assistant driver's seat of the mobile body.

* * * * *